United States Patent
Zhu et al.

(10) Patent No.: US 10,860,578 B2
(45) Date of Patent: Dec. 8, 2020

(54) METHOD AND SYSTEM FOR ENHANCED SEARCH TERM SUGGESTION

(71) Applicant: R2 Solutions, LLC, Frisco, TX (US)

(72) Inventors: Shenhong Zhu, Santa Clara, CA (US);
Kazuhiro Nakao, Sunnyvale, CA (US);
Farzin Maghoul, Hayward, CA (US)

(73) Assignee: R2 Solutions, LLC, Frisco, TX (US)

( * ) Notice: Subject to any disclaimer, the term of this patent is extended or adjusted under 35 U.S.C. 154(b) by 203 days.

(21) Appl. No.: 16/052,898

(22) Filed: Aug. 2, 2018

(65) Prior Publication Data
US 2018/0341675 A1 Nov. 29, 2018

Related U.S. Application Data

(63) Continuation of application No. 14/575,445, filed on Dec. 18, 2014, now Pat. No. 10,073,884.

(51) Int. Cl.
*G06F 16/2453* (2019.01)
*G06N 7/00* (2006.01)
*G06F 16/951* (2019.01)
*G06F 16/332* (2019.01)

(52) U.S. Cl.
CPC .... *G06F 16/24534* (2019.01); *G06F 16/3322* (2019.01); *G06F 16/951* (2019.01); *G06N 7/005* (2013.01)

(58) Field of Classification Search
CPC ....... G06Q 10/00; G06F 16/258; G06F 40/20; G06F 16/955
See application file for complete search history.

(56) References Cited

U.S. PATENT DOCUMENTS

| | | | |
|---|---|---|---|
| 2009/0164428 A1* | 6/2009 | Green | G06F 16/258 |
| 2010/0325100 A1 | 12/2010 | Forstall et al. | |
| 2011/0093465 A1* | 4/2011 | Sporer | G06Q 10/00 707/737 |
| 2013/0110497 A1* | 5/2013 | Medero | G06F 40/20 704/9 |

* cited by examiner

*Primary Examiner* — Etienne P Leroux
(74) *Attorney, Agent, or Firm* — The Noblitt Group, PLLC

(57) ABSTRACT

Method, system, and programs for providing enhanced search term suggestions. A set of incomplete search terms indicating a sequence of search terms entered may be received. It may be detected that the sequence contains a descending phase followed by an ascending phase. In response to the detection, a pair of misinput term and corresponding corrected term may be identified in the set of incomplete search terms. A probability with respect to the misinput term is a misinput of the corresponding corrected term may be determined based on a historical context. Using such a probability, an incomplete search term containing the misinput term may be corrected. One or more proposed search terms may be determined based on the corrected incomplete search term for suggestion to the user.

18 Claims, 22 Drawing Sheets

710

Misinput Detection Criteria

Edit Distance Criteria (e.g., a minimum or maximum number of backspacing required before mistyping is detected) ...

Approximation Criteria (e.g., a number of neighboring terms compared) ...

FIG. 7

METHOD AND SYSTEM FOR ENHANCED SEARCH TERM SUGGESTION

CROSS-REFERENCE TO RELATED APPLICATION

The present application is a continuation of U.S. patent application Ser. No. 14/575,445 filed Dec. 18, 2014, which is incorporated herein in its entirety.

BACKGROUND

1. Technical Field

The present teaching relates to methods, systems and programming for processing user search inquiries. Particularly, the present teaching is directed to methods, systems, and programming for suggesting search term(s) to a user.

2. Discussion of Technical Background

The advancement in the world of the Internet has made it possible to make a tremendous amount of information accessible to users located anywhere in the world. A search engine is a computer system or application that helps a user to locate the information. Using a search engine, a user can execute a search via a search term to obtain a list of information (i.e., search results) that matches the search term. While search engines may be applied in a variety of contexts, search engines are especially useful for locating resources that are accessible through the Internet.

Some search engines order the list of matching information before presenting the list to a user. For achieving this, a search engine may be configured to assign a rank to the matching information in the list. When the list is sorted by rank, matching information with a relatively higher rank may be placed closer to the head of the list than other matching information with relatively lower ranks. The user, when presented with the sorted list, sees the most highly ranked matching information first. To aid the user in his/her search, a search engine may rank the matching information according to relevance. Relevance is a measure of how closely the subject matter of particular information matches a search term.

In a typical situation, the user is enabled to enter an intended search term from a client computing platform associated with the user (e.g., smartphone, tablet, laptop, desktop, or any other client computing platform) via a user interface. Once the user completes inputting the intended search term, the completed search may be transmitted, over a communications network such as the Internet, to the search engine for execution. The user interface typically comprises an input box that allows the user to enter the intended search term one letter at a time.

Conventional search term suggestion techniques for determining and suggest proposed search term(s) to a user when the user is in progress of entering an intended search term typically employ a database to store historical search terms completed by a particular user and/or search terms completed by users that are "similar" to that particular user. As the particular user is in progress of entering an intended search term, these conventional techniques search the database for candidate terms that may be suggested to the user based on their relevance to the incomplete intended search term entered by the particular user thus far.

In entering the intended search term, the user, however, may not always correctly input letters into the intended search term. For example, mistyping of the search term might happen when the user incorrectly inputs some letters into the intended search term. For instance, the user may misinput (skip, unnecessarily add, and/or wrongly input) one or more letters in the intended search term. In another example, the user may modify the intended search term to correct grammar, to have a more precise meaning, to change to another search term and/or for any other concerns.

Therefore, there is at least a need to account for situations when a search term as being input may be incorrect when determining proposed search term(s) to be suggested to the user.

Therefore, there is a least a need to detect an incomplete search term as being input by a user contains misinput letters or characters when determining proposed search term(s) to be suggested to the user because the incomplete search term may not be the search term intended by the user.

Therefore, there is a least a need to establish storage to store information indicating input sequences of search terms by a user are incorrect for facilitating determining proposed search term(s) to be suggested to the user.

Therefore, there is a least a need to enable detection of misinput search term as being input a user.

SUMMARY

The teachings disclosed herein relate to methods, systems, and programming for processing user search inquiries. More particularly, the present teaching relates to methods, systems, and programming for determining proposed search term(s) to be suggested to the user based on input sequence of search terms entered by the user.

In one example, a method, implemented on a machine having at least one processor, storage, and a communication platform connected to a network, for building sequences of search terms in association with corresponding probability of misinput. By this method, a set of incomplete search terms may be first received. The received incomplete search terms may correspond to a sequence of search term entered by a user. It may then be detected in the sequence there is a descending phase followed by an ascending phase. Such detection may reveal that the search term has been misinput and has been corrected by the user. In response to the detection, a pair of misinput term and corresponding corrected term may be identified in the set of incomplete search terms. A probability with respect to the misinput term is a misinput of the corresponding corrected term may be determined based on occurrences of these terms in a historical context. In one example, such a probability may be determined using a noisy channel model. The probability may then be stored in association with the pair in storage for future use.

In another example, a method, implemented on a machine having at least one processor, storage, and a communication platform connected to a network for enhanced search term suggestion is disclosed. In this method, an incomplete search term as being input by a user may be received. Storage of sequences of search terms entered by the user and/or other users historically may be consulted for determining whether the received incomplete search term is misinput. In one example, an entry of the database may indicate an incomplete term in the received incomplete search term has a probability to mean the user actually intended a corresponding term. In that example, based on such probability or probabilities, an incomplete search term may be corrected. One or more proposed search terms (e.g., complete search term, but not necessarily limited to complete search term)

may be determined based on the corrected incomplete search term for suggestion to the user.

Other concepts relate to software for implementing the enhanced search term suggestions. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for making enhanced search term suggestions, where when the information is read by the machine, causes the machine to receive a set of incomplete search terms corresponding to a sequence of a search term entered by a user; detect in the sequence a descending phase followed by an ascending phase indicating that at least one search term in the set of incomplete search terms has been corrected; identify, in the set of incomplete search terms, a pair of a misinput term and a corresponding corrected term, in response to the detection; determine a probability with respect to the misinput term is a misinput of the corresponding corrected term; and store the pair with the probability for future use.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7 illustrates an example of the misinput detection criteria that may be used to identify a pair of incomplete search terms represent a misinput term and a corresponding corrected term;

DETAILED DESCRIPTION

Figure 1A:
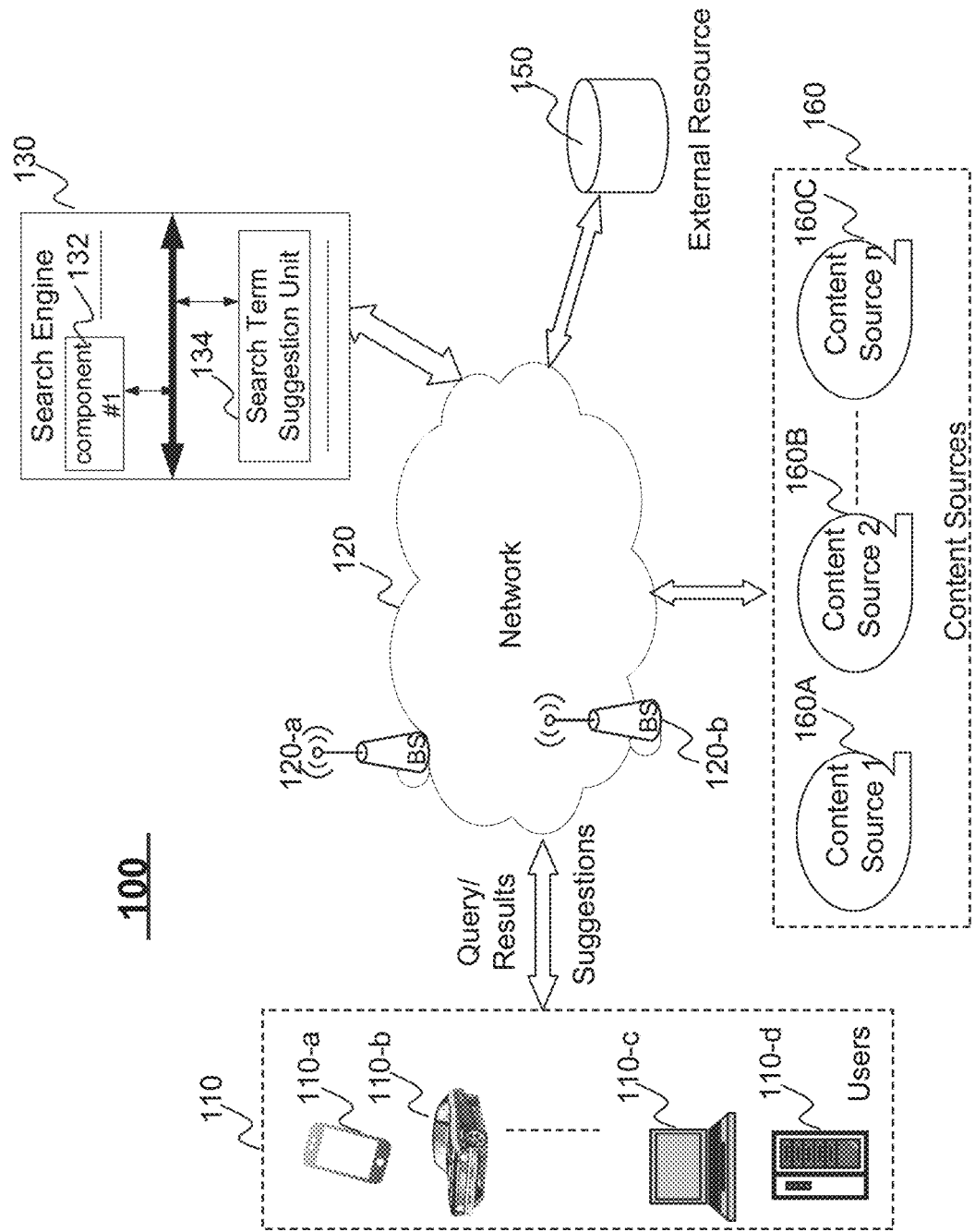
FIGS. 1A-1C illustrate a high level depiction of exemplary systems in which enhanced search term suggestion is applied in accordance with the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to systems, methods, medium, and other implementations directed to enhancing search term suggestion based on corrected misinput in a set of incomplete search terms realized as a specialized and networked system by utilizing one or more computing devices (e.g., mobile phone, personal computer, etc.) and network communications (wired or wireless). The disclosed teaching on enhanced search term suggestion includes, but not limited to, an online process and system that in situations where a user may enter search terms from a client computing platform associated with the user. The progress of the user entering the search term may be monitored by recording the incomplete search terms as being input by the user towards the corresponding complete search term. Such incomplete search terms may reveal a sequence of different versions of a search term entered by the user with, e.g., the final version being the search term actually intended by the user. Such a sequence of different versions of a search term entered by the user may be recorded and leveraged for improving search term suggestions.

Based on the sequence of a search term as entered by a user, it may be identified whether the sequence contains a descending phase followed by an ascending phase. In cases where such phases are detected, a pair of misinput search term and corresponding corrected search term may be identified from the set of incomplete search terms. Intuitively, the corresponding corrected search term is what is intended by the user and the misinput in the pair is a misinput of what is intended. According to the present teaching, to facilitate improved search suggestion, a probability that the misinput term is indeed a misinput of the corresponding corrected term may be computed based on occurrences of these terms in a historical context. The probability may then be stored in association with the pair, e.g., as an entry in a database, as a probabilistic suggestion alternative for a future misinput as recorded based on the corresponding corrected search term as stored. To utilize the stored probabilistic suggestion alternatives to make a search term suggestion, incomplete search terms entered by a user during a future session may be monitored while the system is in consultation with the database. When a misinput term is detected entered by the user, the stored corresponding corrected search term may be retrieved and used to replace the misinput term to automatically correct the misinput using the stored corrected incomplete search term. When there are multiple pairs corresponding to the same misinput, each with a separate probability, the system implemented according to the present teaching may select a suggestion that has the highest probability.

As used herein, an intended search term may be referred to as a search term intended by a user for a search engine to execute and to return a list of information matching the search term.

As used herein, an incomplete search term may be referred to as a search term that is partially input by a user. As such, an incomplete search term may or may not constitute a part of the intended search term actually meant by the user. For example, there are situations in which the user may misinput (e.g., skip, unnecessarily add, and/or use wrong letter/characters) when entering an incomplete search term.

As used herein, an input sequence of an incomplete search term by a user may be referred to as a sequence of letters while the user entering the incomplete search term. It should be appreciated that a user may enter an incomplete search term using any suitable input means, such as, but not limited to, key strokes enabled by a physical keyboard, finger tapping enabled by a virtual keyboard, finger swiping enabled by a touch pad, voice commands enabled by a voice recognition service, stylus writing enabled by a touch pad, and/or any other input means. It should also be appreciated that the input sequence of an incomplete search term may not necessarily be limited to one letter at a time. For example, it is understood that an input sequence by, e.g., swipe typing or suggested typing may be used by a user to input multiple letters into an incomplete search term at a time. It is also understood that, although various examples illustrated in this disclosure are English based search terms, the present teaching is not limited to English based search terms. For example, the present teaching may be applied to an input sequence of an incomplete search term in any language, such as Spanish, German, French, Chinese, Korean, Japanese, Greek, Latin, and Hindi. The present teaching is also not limited to linguistically meaningful input and may include any commonly known meaningful sequence of symbols, such as math symbols, chemistry symbols, and/or any other types of inputs of letters, alphabets or characters, and numerals that may be used in human communications.

As used herein, the terms "letter", "alphabet", "character" may be used interchangeably in the context of a search term to mean a singular constituting part of a search term.

Figure 1B:
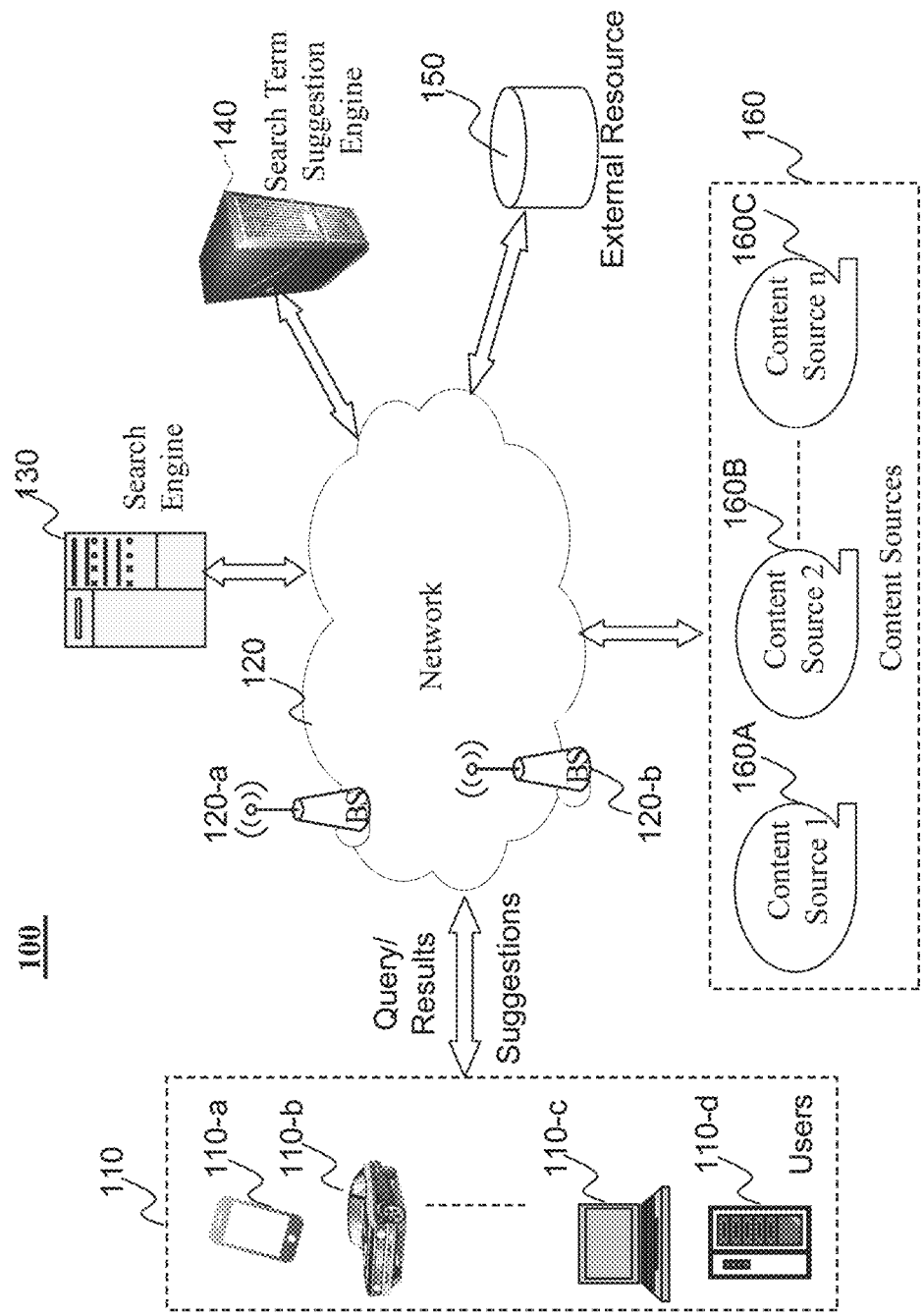
Figure 1C:
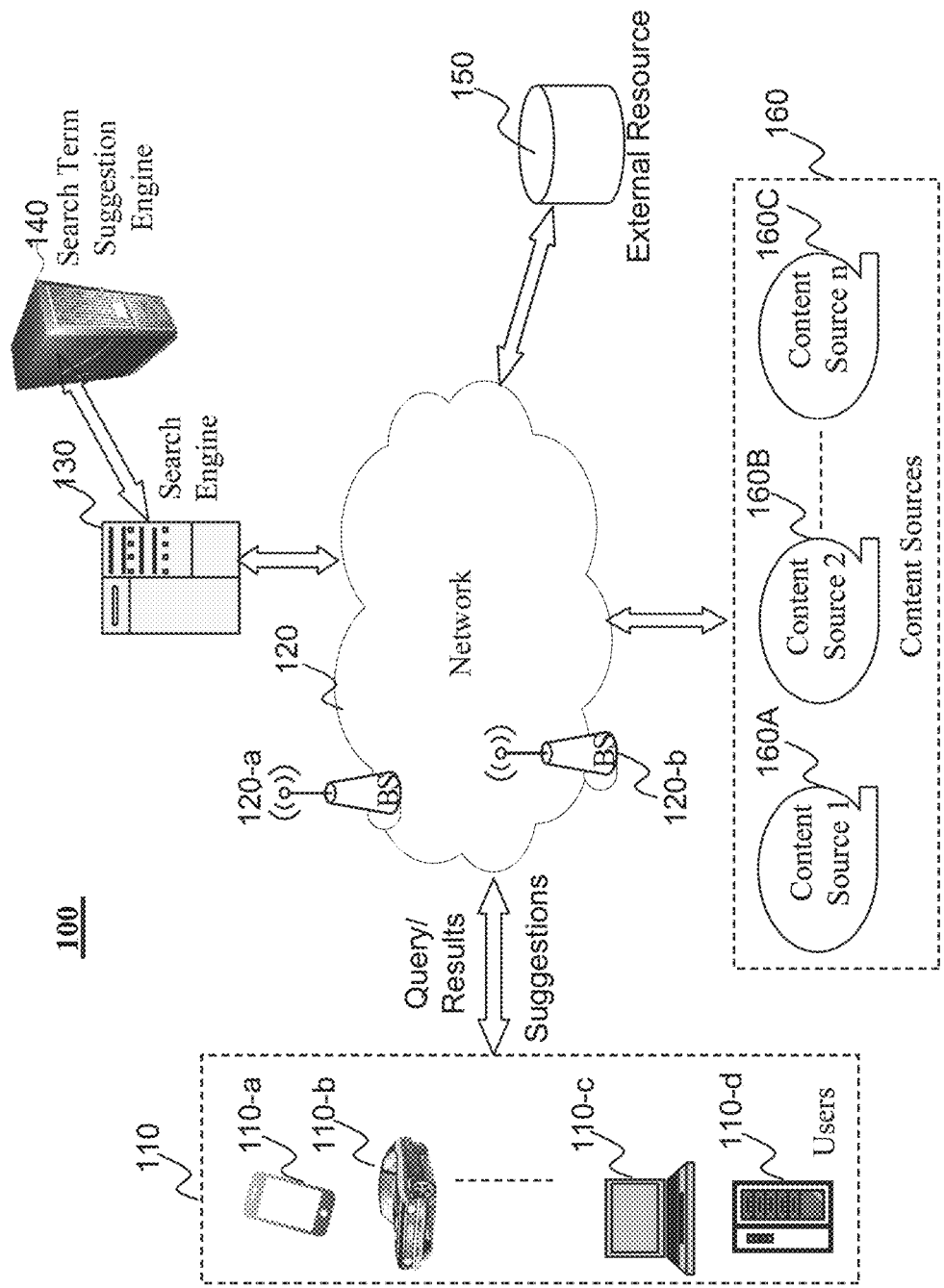

FIGS. 1A-1C illustrate exemplary system configurations in which enhanced search term suggestion can be deployed in accordance with various embodiments of the present teaching. In FIG. 1A, the exemplary system 100, as shown, includes users 110, a network 120, a search engine 130, content sources 160, external resource(s) 150, content sources 160 and other components (if any). The network 120 in system 100 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 120-a, . . . , 120-b, through which a data source may connect to the network in order to transmit information via the network.

Users 110 may be of different inputs such as users connected to the network via desktop connections (110-d), users connecting to the network via wireless connections such as through a laptop (110-c), a handheld device (110-a), or a built-in device in a motor vehicle (110-b). A user may send a query to the search engine 130 via network 120 and receive a query result from the search engine 130 through network 120. Based on the query received from the user, as illustrated in FIG. 1A, search term suggestions may be returned to the user to aid the user to complete or fine tune the query.

The exemplary system 100 as shown in FIG. 1A includes a search engine 130, which may include various components including a search term suggestion unit 134. As illustrated in FIG. 1A, these components in the search engine 130 may operate and communication with each other via a bus or buses included in the search engine 130. The search term unit 134 may be configured to provide enhanced search term suggestion in accordance with the present teaching. It should be understood the architecture with respect to providing enhanced search term suggestion in accordance with the present teaching is not limited to that shown in FIG. 1A. For example, FIG. 1B illustrates another architecture by which enhanced search term suggestion in accordance with the present teaching may be provided. As shown in FIG. 1B, the functionality attributed to search term unit 134 may be provided by a search term suggestion engine 140, which may be discrete and separate from the search engine 130 as shown. As illustrated, the search term suggestion engine 140 may be connected to the search engine via network 130. In one example, the search engine 130 may employ search term suggestion engine 140 by forwarding search terms to the search term suggestion engine 140 and receiving search term suggestions from the search term suggestion engine 140. FIG. 1C illustrates yet another architecture by which enhanced search term suggestion in accordance with the present teaching may be provided. As shown in FIG. 1C, the search term suggestion engine 140 may be operatively connected to the search engine 130 via a suitable communication channel. For example, the search term suggestion engine 140 and the search engine 130, as shown in FIG. 1C, may be located in the same server rack cabinet, or the same server room.

The external resources 150 may include sources of information, hosts and/or providers of Internet services outside of system 100, external entities participating with system 100, and/or other resources. In some implementations, some or all of the functionality attributed herein to external resources 150 may be provided by resources included in system 100. Examples of external resources may include data resources provided by third party content providers, Internet services provided by third party internet service providers, advertisement servers, and/or any other inputs of resources provided by participants external to system 100.

The content sources 160 may include multiple content sources 160-a, 160-b, ..., 160-c. A given content source 160 may correspond to a web page host corresponding to an entity, whether an individual, a business, or an organization such as USPTO.gov, a content provider such as cnn.com and Yahoo.com, or a content feed source such as tweeter or blogs. The search engine 130 may access information from any of the content sources 160-a, 160-b, ..., 160-c and rely on such information to respond to a query (e.g., the search engine 130 identifies content related to keywords in the query and returns the result to a user). Similarly, the search term suggestion engine 140 may access additional information, via network 120.

In the exemplary system 100 shown in FIGS. 1A-C, a user may inquire about certain information by entering search term for a client computing platform such as 110-a to 110d. For example, the user may inquire about "what is the best Oscar movie 2014" by entering a search term indicating such one or multiple characters/letters at a time from a client computing platform 110. The search term suggestion unit 134 (FIG. 1A) or the search term suggestion engine 140 (FIGS. 1B-C) may receive a set of incomplete search terms as the user enters the search term. The set of incomplete search terms may reveal different versions of the search term actually intended by the user. Based on the incomplete search terms received, the search term suggestion unit 134 or the search term suggestion engine 140 may determine search suggestions for presentation on the user client computing platform 110.

Figure 2:
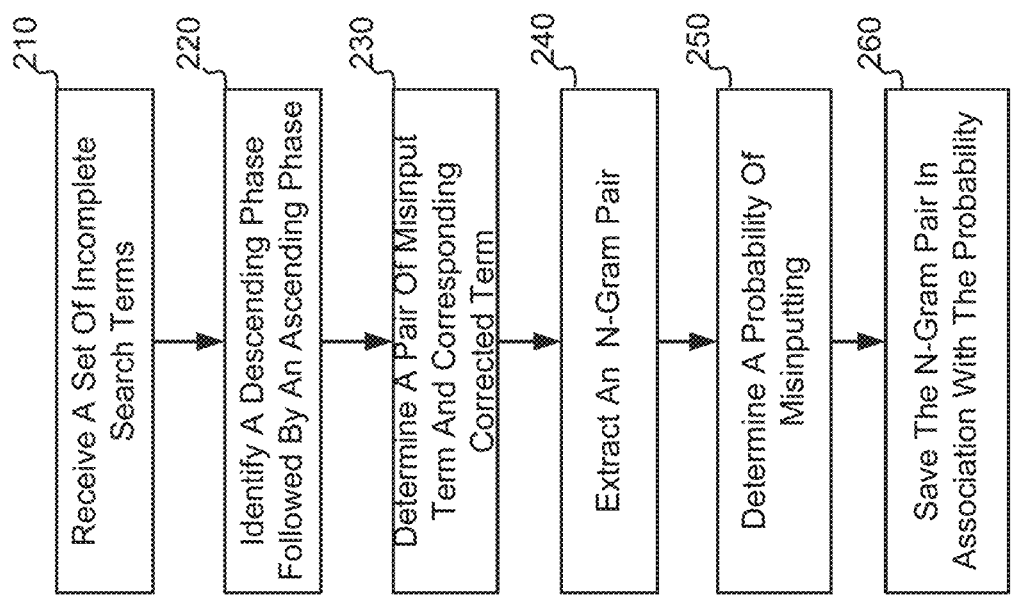
FIG. 2 is a flowchart of an exemplary process of determining an incomplete search term is misinput by a user in accordance with one example of the disclosure.

FIG. 2 is a flowchart of an exemplary process of determining an incomplete search term is misinput by a user in accordance with one example of the disclosure. It will be described with reference to FIGS. 1A-C. As shown, at 210, a set of incomplete search terms may be received. The incomplete search terms may indicate search terms partially entered by the user for inquiring about related information. For example, the incomplete search terms may be partially entered by the user before the user engages an inquiry represented by the search term (complete)—for example, by hitting the "search button" provided by a graphical user interface implemented on the client computing platform 110. In some implementations, a client program module such as a user input monitor (e.g., keystroke monitor) may be installed on the client computing platform to monitor user progress of entering a search term (character(s)/letter(s) by character(s)/letter(s)). In those implementations, a progress of user entering the search term may be reported to the search engine 130 (FIG. 1A) and/or the search term suggestion engine 140 (FIGS. 1B-C). By way of non-limiting example, individual ones of the letters in the search term "what is the best Oscar movie 2014" may be reported to the search engine 130 and/or the search term suggestion engine 140 sequentially as they are entered by the user on the client computing platform. However, it should be appreciated that the incomplete search term may be received in some other ways that are not necessarily "real-time" as described above. For example, the incomplete search terms may be received from a database in which historical search terms may be stored in association with corresponding users. Such a database may store the historical search terms in a "replay" format to reflect how the search terms were entered by the users. For example, if a user entered a search term with 3 backspaces to erase a typo, the 3 backspaces may be captured in the database in the "replay format" such that the entering of the search term by the user may be "replayed" for analysis, for example in accordance with the present teaching.

Figure 3:
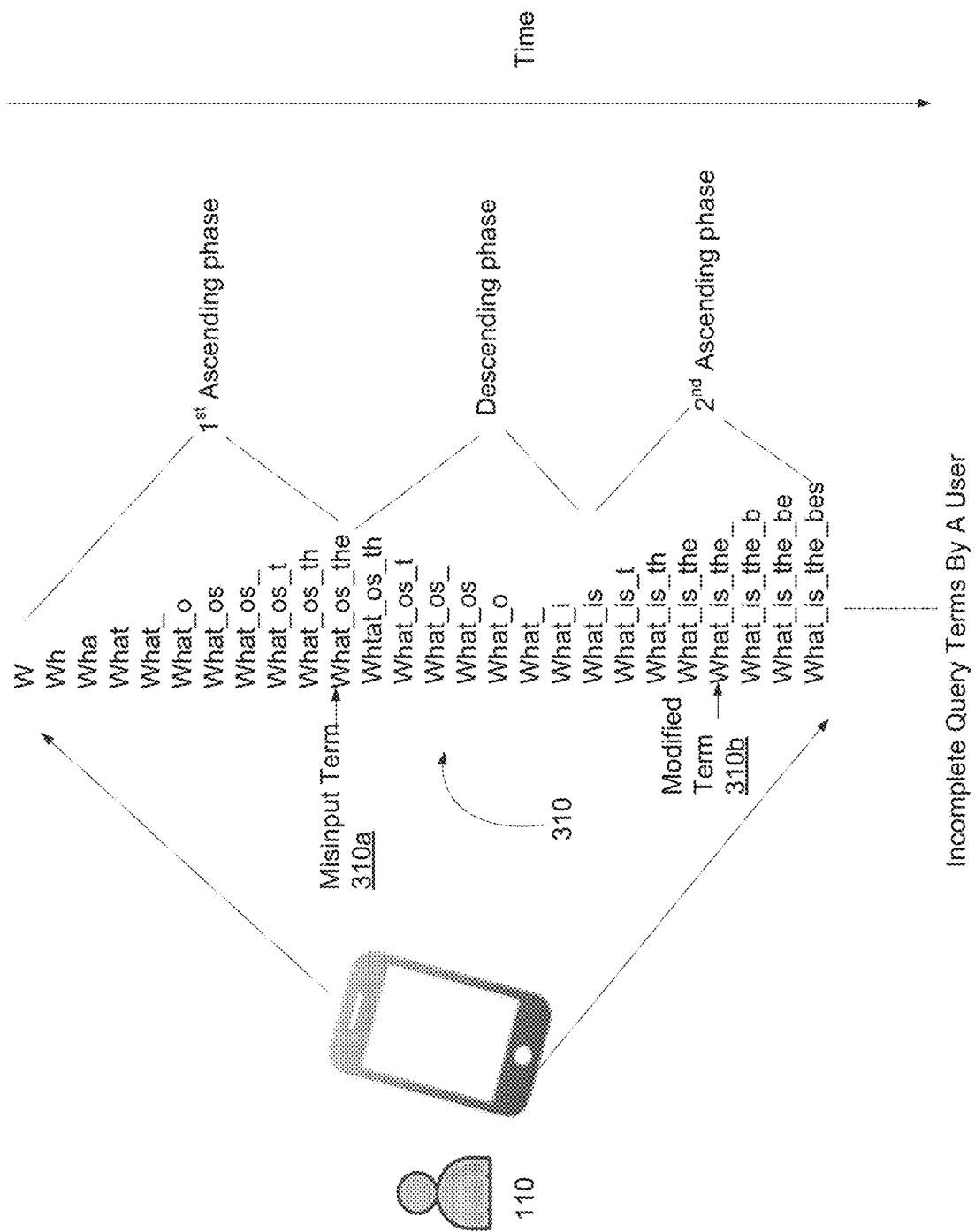
FIG. 3 illustrates one example of incomplete search terms that may be entered by a user for inquiring about related information.

FIG. 3 illustrates one example of incomplete search terms that may be entered by a user for inquiring about related information. It will be described with reference to FIGS. 1A-C and FIG. 2. As shown, the user 110 may enter a set of search terms 310 for inquiring about "what is the best Oscar movie 2014". A given one of the search terms 310 as shown may indicate a partially entered search term input by the user at a corresponding time point. As described above, the incomplete search terms 310 may be received at step 210.

Returning to FIG. 2, at 220, a descending phase followed by an ascending phase may be detected in the search terms received at 210. In implementations, for such detection, the incomplete search terms received at 210 may be compared with one another. Referring to FIG. 3, as shown, as the length of the incomplete search terms received grows, a first ascending phase may be indicated, which may mean the user is adding letter or character to the search term. When the length of the incomplete search terms starts reducing, a descending phase may be detected, which may mean the user is backspacing (e.g., erasing) previously input letter(s)/character(s). A second ascending phase may be detected as the length of the search terms starts growing again after the detection of the descending phase, which may mean the user has finished erasing misinput characters/letters and starts adding letter(s)/character(s) in place of the erased ones and as well as new ones to complete the search term.

Returning to FIG. 2, at 230, a pair of misinput term and corresponding corrected term may be determined from the set of search terms received at step 210, in response to the detection at step 220. This is also illustrated in FIG. 3. As shown in FIG. 3, the incomplete search term at the beginning of the descending phase, i.e., the incomplete search term 310a, may be obtained as the misinput term, and the incomplete term 310b in the ascending phase may be obtained as the corresponding corrected term. In one implementation, the term 310b may be obtained in the second ascending phase because it has the same length as the term 310a. However, it should be understood this is not necessarily the only case. In some other examples, criteria other than identical length may be used to obtain the corresponding corrected term 310b and will be described below.

Returning to FIG. 2, at 240, an n-gram pair may be extracted from the search term pair determined at step 230. As used herein, n-gram may be referred to as n number of letters/characters in a search term. Accordingly, at step 240, an n (e.g., 6) letter long "gram" may be extracted from the misinput term 310a and corresponding n letter long "gram" may be extracted from the corresponding corrected term 310b.

At 250, a probability of the n-gram pair indicates a future occurrence of the first n-gram (in the pair) in a search term entered by a user may mean the user actually intends to enter the second n-gram (in the pair). Various statistical models may be applied to determine such a probability. For example, in one implementation, a noisy channel model may be used to determine whether the first n-gram in the pair extracted at 240 is indeed a misinput of the second n-gram in that pair. To use the noisy channel model, historical search terms entered by the user and/or other users may be obtained, for example from a database of search terms captured in "replay" format as described above. With such information, the number of times the first n-gram was input by the user historically without and with changing to the second n-gram may be obtained, respectively. With this information, a probability that the first n-gram in the pair when entered by the user in the future actually means the second n-gram in the pair may be determined.

At 260, the probability determined at step 250 may be stored in association with the n-gram pair extracted at step 240. For example, the n-gram pair along with the probability may be saved as an entry in a correction database. The correction database having such entries may be used to correct incomplete search terms for making search suggestions in the future.

Figure 4:
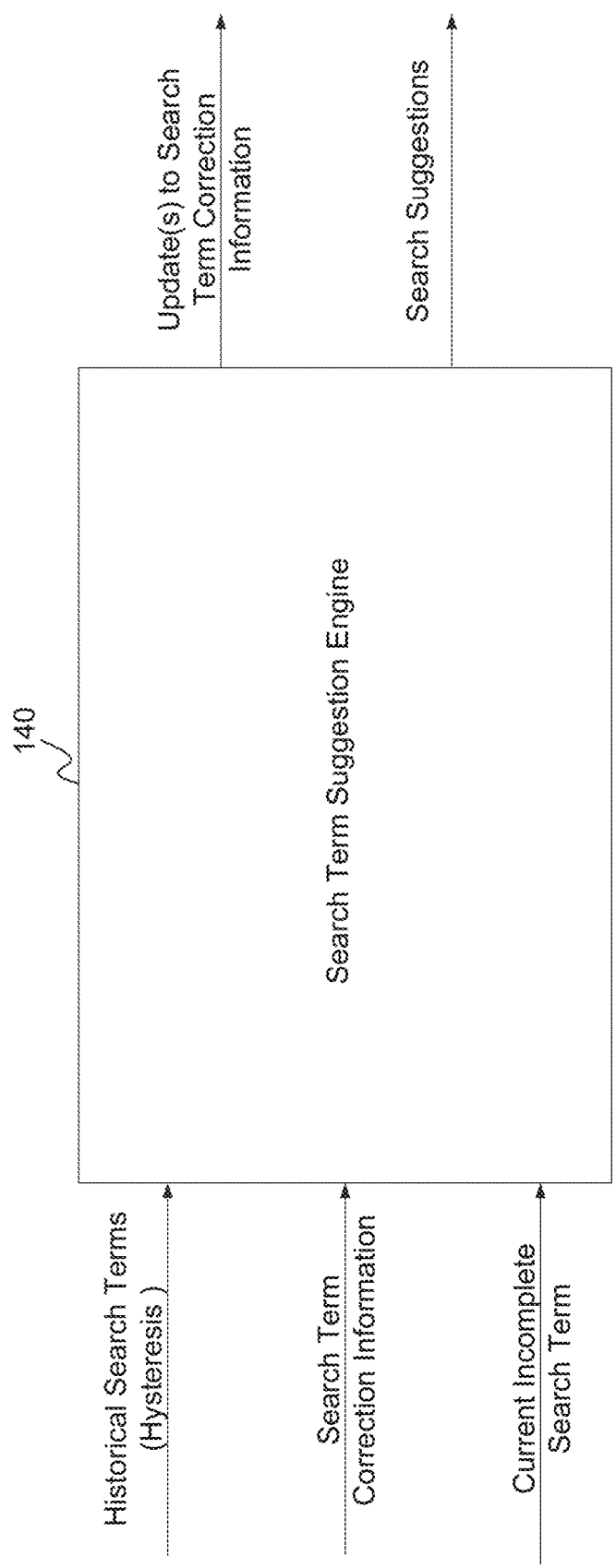
FIG. 4 is a high level depiction of an example of search term suggestion engine shown in FIG. 1.

FIG. 4 is a high level depiction of an example of search term suggestion engine 140 shown in FIG. 1. As shown, the search term suggestion engine 140 may be configured to receive historical search terms input by a user of interest and/or other users similar to that user. For example, without limitation, the historical search terms may include search terms entered by the user in the past 30 days, and/or by users identified to be similar to the user (e.g., having similar age, similar interests, similar region of residence, and any other similarity). The historical search terms, as described above, may be in a "replay" format capturing exactly how the search terms were entered by the user or users including backspaces. As also shown, the search term suggestion engine 140 may be configured to generate updates to correction information (correction database) as described above. For example, using the historical search terms, the search term suggestion engine 140 may obtain n-gram pairs and associated probabilities of misinput as indicated by the n-gram pair, and stored the n-gram pairs and the associated probabilities in a correction database as search term correction information. As still shown, the search term suggestion engine may be configured to receive the search term correction information and a current incomplete search term. Based on the search term correction information (e.g., a first n-gram has 90% of chance actually means a second n-gram if the first n-gram appears in the current incomplete search term), the search term suggestion engine may make a correction to the current incomplete search term and make search term suggestions based on the corrected incomplete search term.

Figure 5:
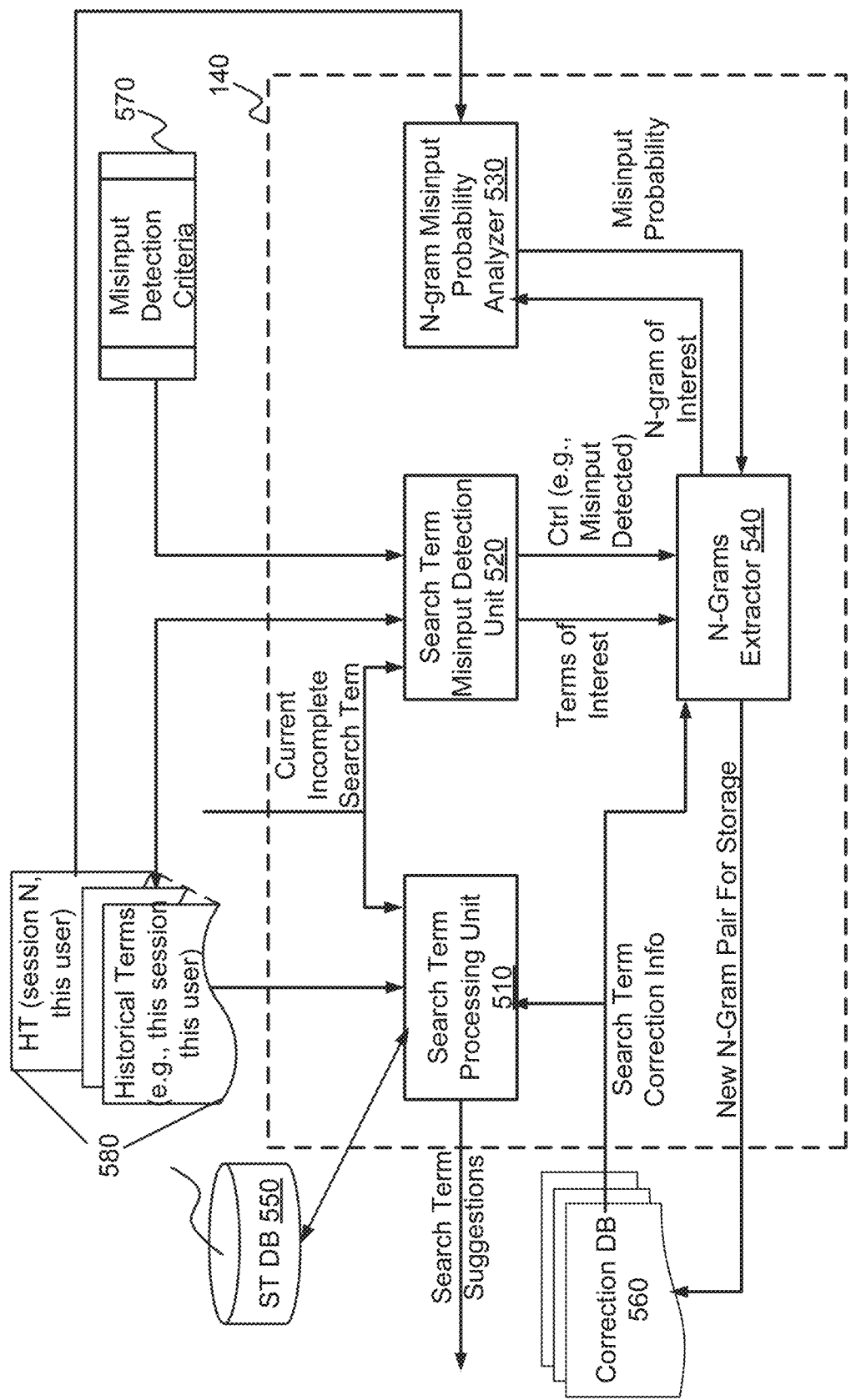
FIG. 5 illustrates another example of the search suggestion engine shown in FIG. 1.

FIG. 5 illustrates another example of the search suggestion engine 140 shown in FIG. 1. As shown in this example, the search term suggestion engine 140 may include a search term processing unit 510, a search term misinput detection unit 520, an n-grams extractor 540, an n-gram misinput probability analyzer 530 and/or any other components. The search term misinput detection unit 520 may be configured to receive historical search terms 580, current incomplete search term as being entered by user, and/or any other search term. The search term misinput detection unit 520 may be configured to obtain control output indicating that a descending phase followed by an ascending phase is detected in a given set of search terms received by the search term misinput detection unit 520. As illustrated, the search term misinput detection unit 520 may be configured to determine and forward misinput/correction term pairs (e.g., terms 310a and 310b illustrated in FIG. 3) to the n-grams extractor 540. The determination of the misinput/correction term pairs by the search term misinput detection unit 520 may be based on the misinput detection criteria 570, which may be dynamically configured. As still shown, the n-grams extractor 540 may be configured to extract a pair of n-grams from the terms of interest received from the search term misinput detection unit 520. The N-grams extractor 540 may be configured to forward the extracted n-gram pairs (e.g., n-gram of interest as shown in FIG. 5) to the n-gram misinput probability analyzer 530 for a determination of probability that n-gram pair indicates misinput. As shown, the n-gram misinput probability analyzer 530 may be configured to receive historical search terms and determine the probability that the n-gram pair received from the n-gram extractor 540 indicates misinput by the user. The n-gram misinput probability analyzer 530 may be configured to return the determined probability to the N-grams extractor 540, which may be configured to store the extracted n-gram pair in a correction database 560 as shown. The search term processing unit 510 may be configured to receive current incomplete search terms as being entered by a user, search term correction information (e.g., a probability indicating misinput a second n-gram is misinput as a first n-gram), and historical search terms by the user and/or similar users. Based on the received information, the search term processing unit 510 may be configured to correct the incomplete search term and make search term suggestions based on the corrected search term.

Figure 6:
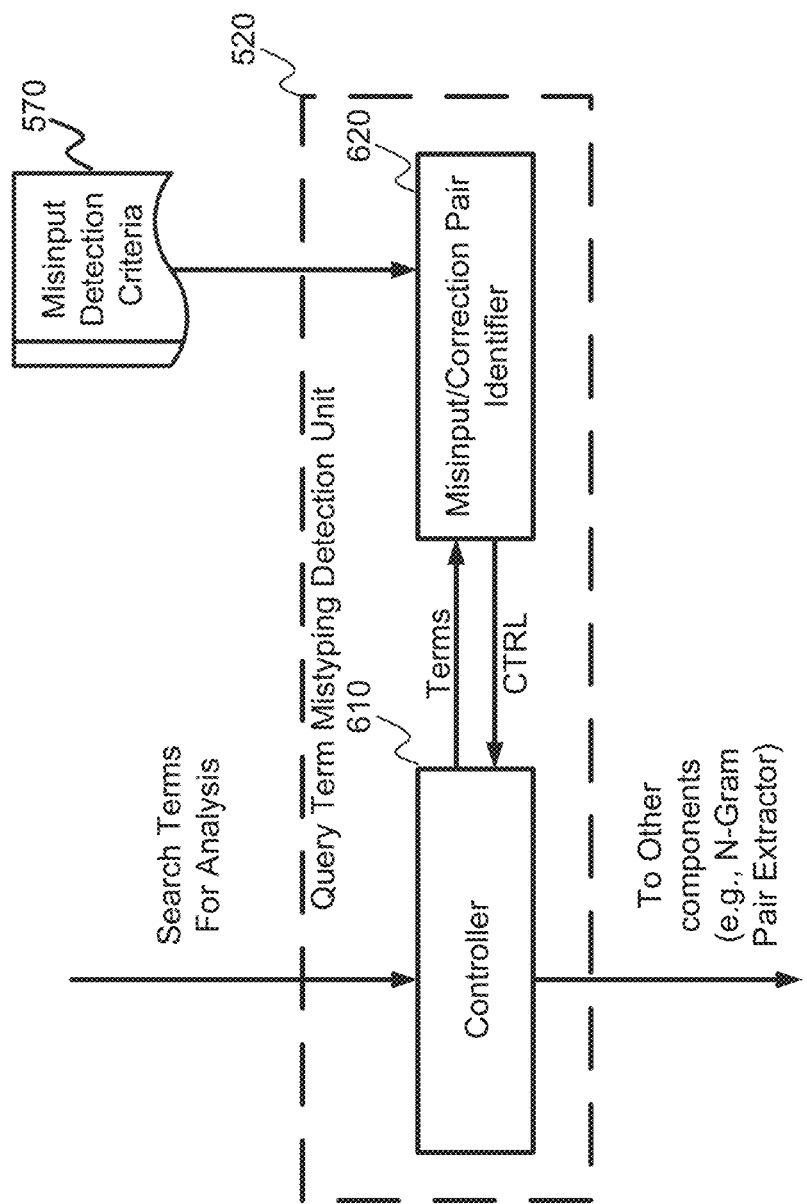
FIG. 6 illustrates an example of search term misinput detection unit shown in FIG. 5.

FIG. 6 illustrates an example of search term misinput detection unit 520 shown in FIG. 5. It will be described with reference to FIG. 5. As shown, the search term misinput detection unit 520 may include a controller 610 and a misinput pair identifier 620. The controller 610 may be configured to receive a set of incomplete search terms, e.g., the historical search terms 580 and/or the current incomplete search terms shown in FIG. 5. As illustrated, the controller 610 may be configured to forward the received terms to the misinput pair identifier 620 for identifying a descending phase followed by an ascending phase in the sequence indicated by the incomplete search terms. As shown, the identification by the misinput pair identifier 620 may be based on misinput detection criteria, such as the misinput detection criteria 570 shown in FIG. 5.

FIG. 7 illustrates an example of the misinput detection criteria that may be used to identify a pair of incomplete search terms representing a misinput term and a corresponding corrected term. As shown in this example, the misinput detection criteria may include an edit distance criteria, which is conceptually illustrated in FIG. 8. As shown, a set of incomplete search terms 810 may be received. The set of incomplete search terms may correspond to a sequence of user entering a search term from a client computing platform. As discussed above, an incomplete term, such as the incomplete search term 810a shown, may be identified as the misinput term because it is at the beginning of the descending phase in the sequence; and a corresponding corrected term, such as the corrected term 810b, may be identified because it has the same length as the misinput term 810a and it is in the ascending phase following the descending phase as shown. As illustrated, the edit distance between the terms 810a and 810b may be a minimum number of edit operations, e.g., single backspace as shown in FIG. 9, required to transform term 810a to term 810b.

Figure 8:
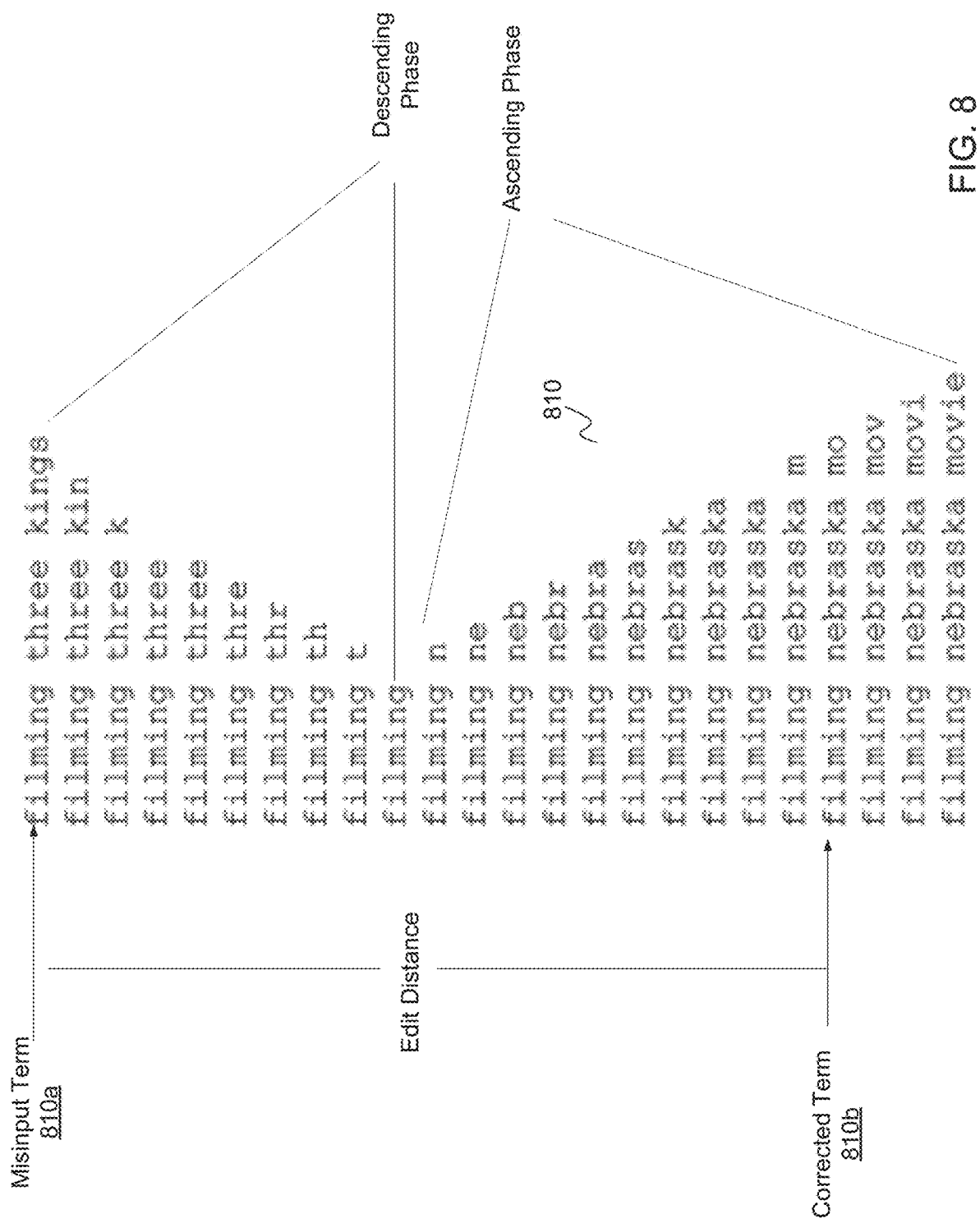
FIG. 8 conceptually illustrates an edit distance between two terms.
Figure 9:
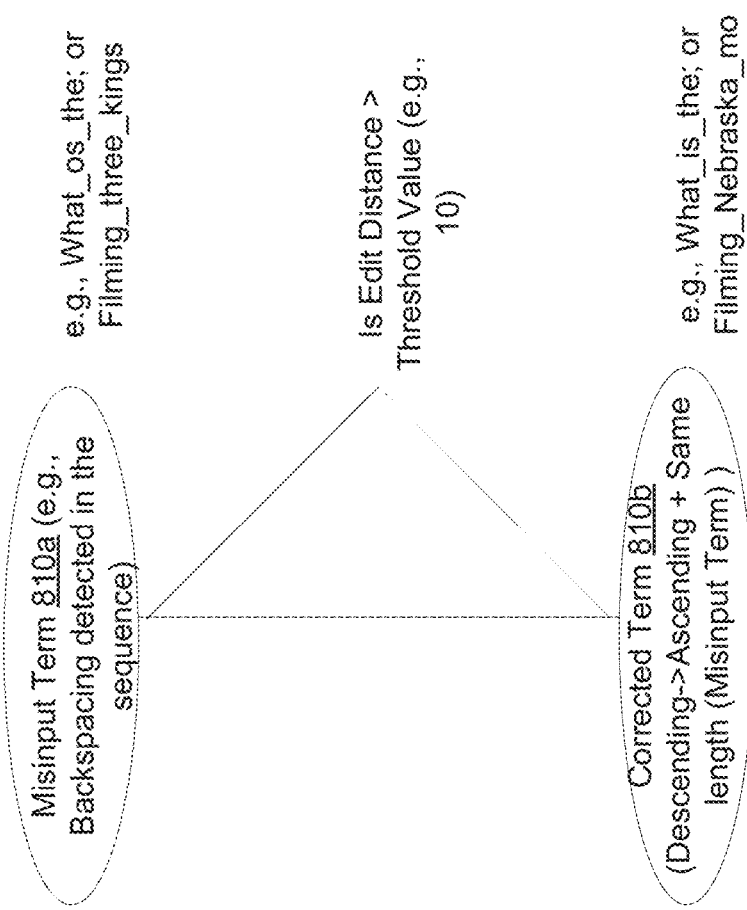
FIG. 9 conceptually illustrates the edit distance criteria shown in FIG. 8 may be used to determine whether a pair of terms represents misinput term and corrected terms.

FIG. 9 illustrates, conceptually, the edit distance between two terms shown in FIG. 8 may be used to identify whether the terms representing a misinput term and corresponding corrected term. As shown, a threshold value may be used to determine whether an edit distance between two terms—e.g., the term at the beginning of the descending phase and the term that has the same length in the ascending phase—has breached the threshold value. This threshold value may be used to reduce misidentifying two terms when they do not represent misinput and corresponding correction. Empirically, edit distance greater than certain value such as 4 to 6 typically indicates a user is erasing previously input characters/letters to fine tune the search term instead of correcting mistyping. In this example, an edit distance threshold of 10 is used. As illustrated, the edit distance between the pair "what os the" and the corresponding "what is the" is less than 10 in this this example, and thus may be used to indicate that this pair of terms represents a misinput and correction pair. By contrast, the edit distance between the pair "Filming three kings" and "Filming Nebraska mo" has breached the threshold value 10, and thus may not represent a misinput term and corresponding correction term.

Figure 10:
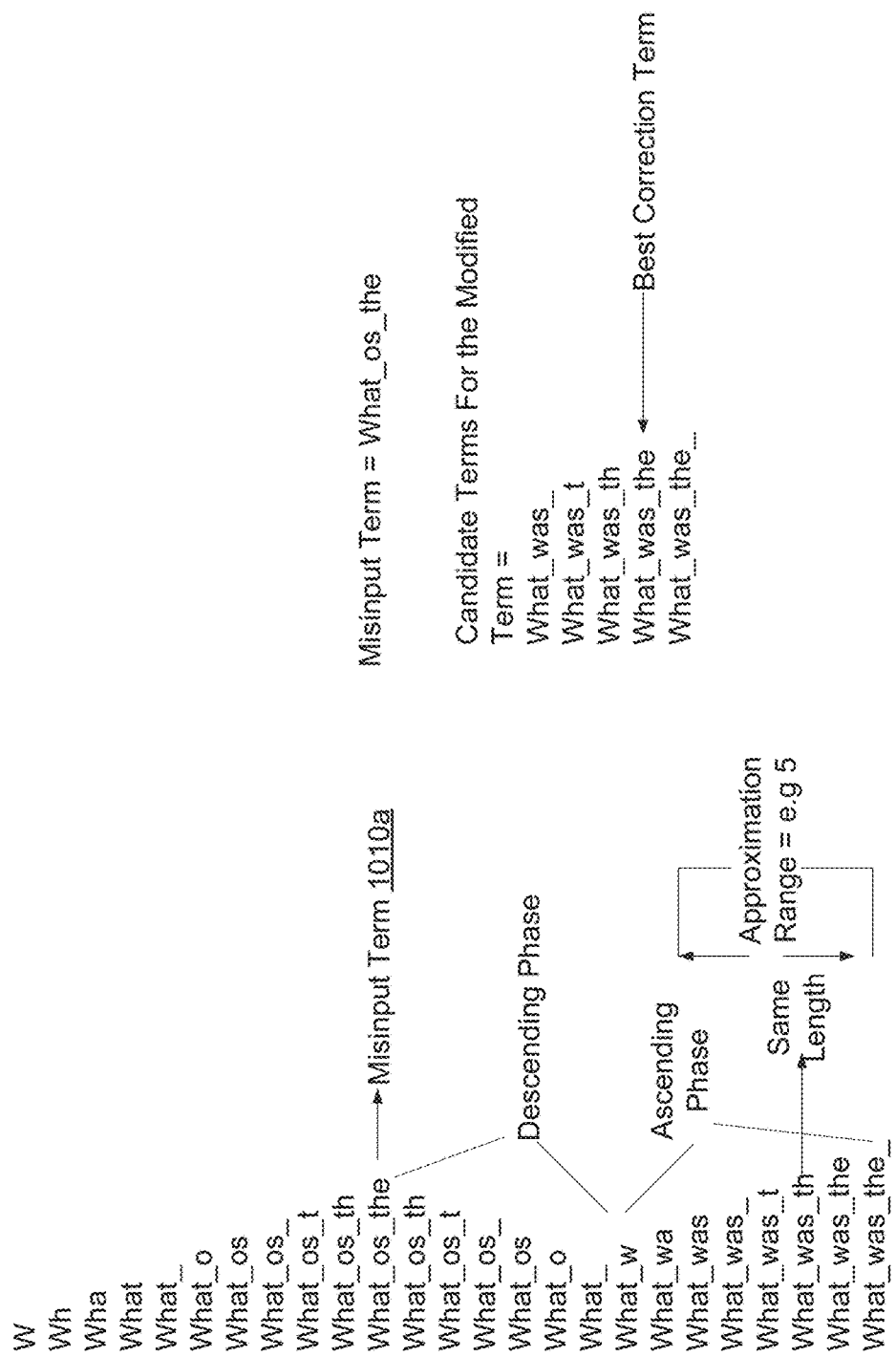
FIG. 10 conceptually illustrates an example of approximation criteria being used to identify the misinput term and the corresponding corrected term.

Returning to FIG. 7, as shown, the misinput detection criteria 710 may include approximation criteria. FIG. 10 conceptually illustrates an example of approximation criteria that may be used to identify the misinput term and the corresponding corrected term. As shown in FIG. 10, a set of incomplete search terms may indicate the user has erased some letters in the search term and add new letter(s) to the search term. To account for situations where the user erased less letters than letters added to the search term, the same length criteria discussed above may be augmented as approximation range criteria. By way illustration, in FIG. 10, the misinput term is "what_os_the" because it is at the beginning of the descending phase. The incomplete search term "what_was_th" as shown would be the corrected term if the same length criteria were used as discussed above because it is located in the ascending phase (following the descending phase) and it has the same number of character(s)/letter(s) as the misinput term 1110a. However, as can be seen in FIG. 10, the best match for the corrected term is not "what_was_th", but rather "what_was_the". This is due to after erasing the typo "os", the user added "was" to replace "os". Since "was" has one more letter than "os", the resulting new search term is longer than the old search term. Accordingly, solely relying on the same length criteria is not enough in this case. To address this, the approximation range criteria may be introduced such that a number of incomplete search terms around "what_was_th" may be examined for determining which one may be the best match. In one example, semantic examination may be used to find the best match among the number of incomplete search terms. For instance, the individual incomplete search terms may be examined to determine a number of semantic words contained in the incomplete search term, and the one with most semantic words and closest to the incomplete search term that has the same length as the misinput term may be determined as the best match for the corrected term corresponding to the misinput term 1010a.

Figure 11:
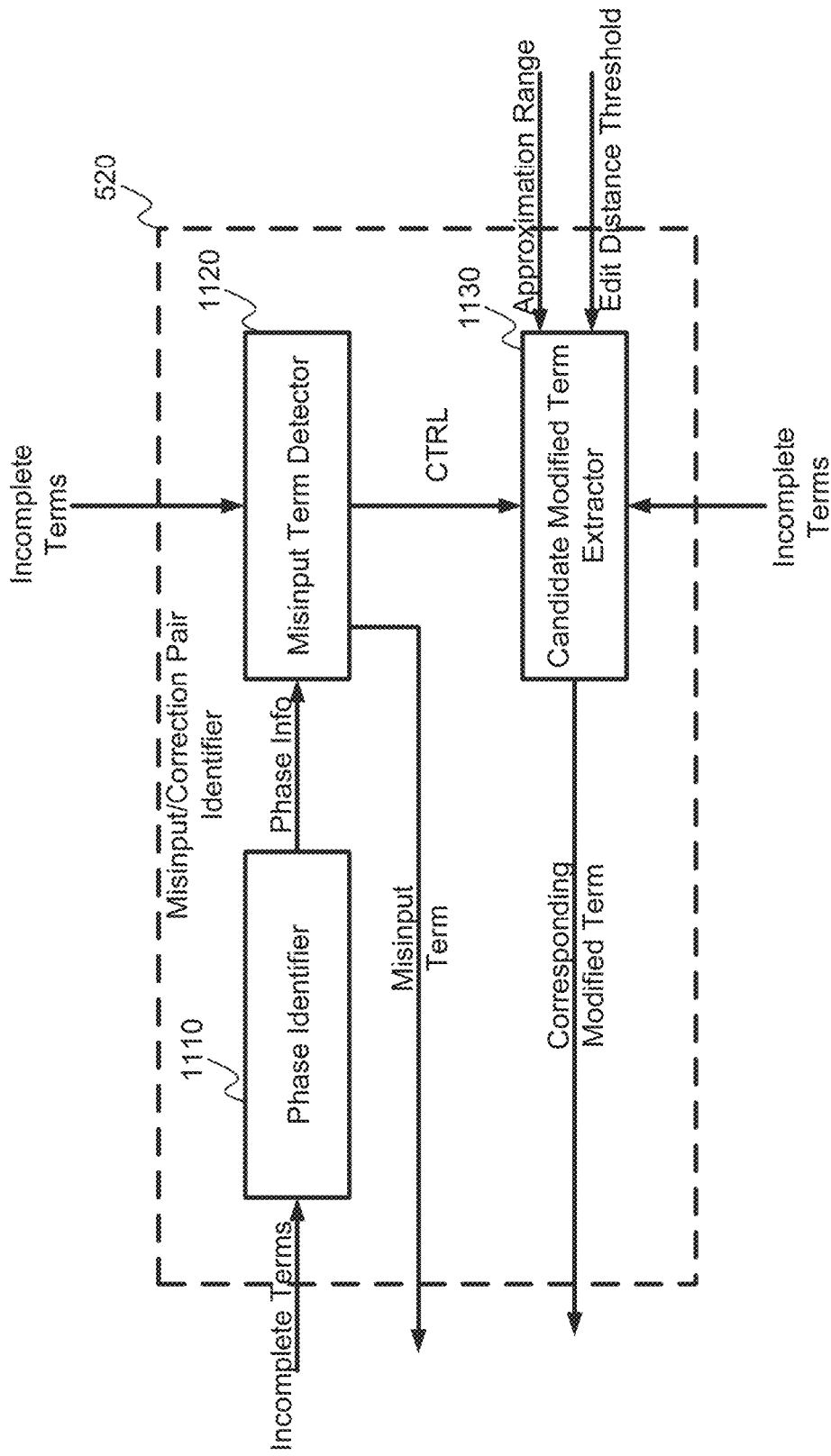
FIG. 11 illustrates an example of misinput/correction pair identifier shown in FIG. 6.

FIG. 11 illustrates an example of misinput/correction pair identifier 620 shown in FIG. 6. As shown, the misinput/correction pair identifier 620 may be configured to include a phase identifier 1110, a misinput term detector 1120, a candidate corrected term extractor 1130, and/or any other components. The phase identifier 1110 may be configured to determine phases in a sequence represented by a set of incomplete terms. The phases that may be determined by the phase identifier 1110 may include an original (first) ascending phase, a first descending phase, a second descending phase immediately following the first descending phase, a second ascending phase immediately following the second descending phase, and/or any other phases. As illustrated, the phase identifier 1110 may forward such phase information to misinput term detector 1120, which may be configured to determine a misinput term in the sequence. As discussed above, in one example, the misinput detector 1120 may be configured to obtain the first incomplete term at the beginning of a descending phase as the misinput term. As still illustrated, the misinput term determinator 1120 may be configured to generate control information instructing the candidate corrected term extractor 1130 to obtain a corrected term corresponding to the misinput term. As shown, the candidate corrected term extractor 1130 may be configured to obtain the corrected term based on received approximation range criteria as (illustrated in FIG. 10), an edit distance criteria (illustrated in FIG. 11) and/or any other criteria.

N-gram is a text processing concept. In some implementations, n-gram pairs may be extracted from the misinput/corrected term pair acquired by the misinput/correction pair identifier 520. For example, a portion of characters/letters in the pair may be extracted as n-grams. This may improve efficiency for future processing. The idea is that only a portion of the misinput and correction pair acquired by the misinput/correction pair identifier 520 may be relevant for correcting any future search terms, therefore only this portion may be stored. This also improves the processing efficiency because less data would be processed in the n-gram case than the misinput/correction pair case.

Figure 12:
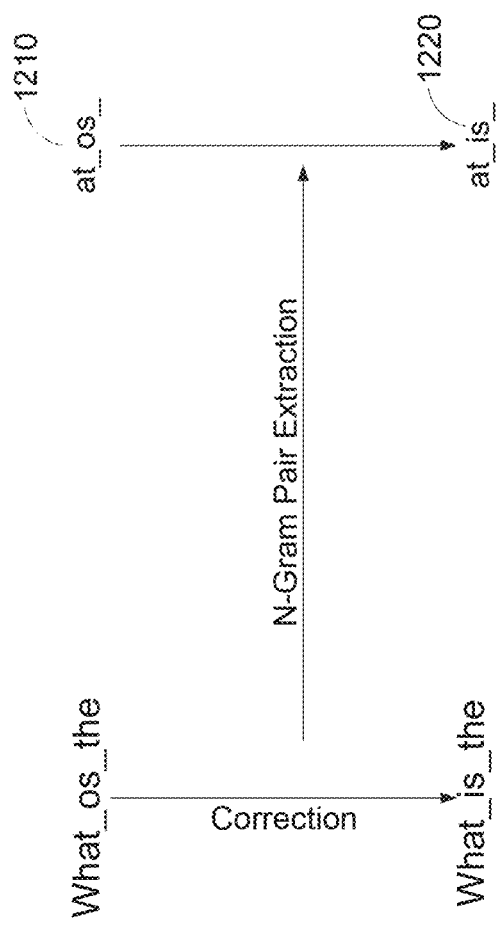
FIG. 12 conceptually illustrates one example of extracting n-grams from the misinput/correction pair illustrated in FIG. 10.

FIG. 12 conceptually illustrates one example of extracting n-grams from the misinput/correction pair illustrated in FIG. 10. As shown, an n-gram 1210 "at_os_" may be extracted from the misinput term "What_os_the". Rules that may be used to extract the n-gram may vary. For example, the desired n-gram may be extracted around the letter when the backspacing was stopped, e.g., 2 letters before and 2 letters after. The length of the n-gram to be extracted may also be however desired. In experiments, the length "6" appears to be optimal in achieving a balance between accuracy and efficiency. However, it should be understood this is not meant to be limiting. One skilled in the art would understand the length of an n-gram n may be any reasonable number determined based on application needs. As also shown in FIG. 12, the n-gram 1220 "at_is_" may similarly be extracted from the corrected term "What_is_the". Thus, the n-gram "at_os_" and "at_is_" may form an n-gram pair.

Figure 13:
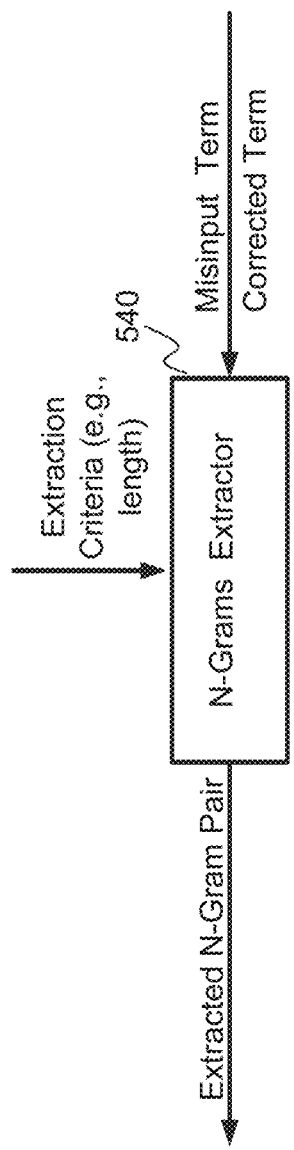
FIG. 13 illustrates an example of N-Grams extractor shown in FIG. 5.

FIG. 13 illustrates an example of n-grams extractor 540 shown in FIG. 5. It will be described with reference to FIG. 5. As shown, the n-grams extractor 540 may be configured to receive misinput term and corrected term, for example from the search term misinput detection unit 520, and receive extraction criteria, such as the length of the n-gram to be extracted, the position in the term where the extraction should begin, and/or any other criteria for extracting n-grams from the terms received. As shown, the n-gram extractor 540 may be configured to extract the n-grams, for example, in a fashion illustrated in FIG. 12.

As discussed above, a probability of the n-grams acquired by the N-grams extractor 540 may be obtained by the N-gram misinput probability analyzer 530. The probability determined by the N-gram misinput probability analyzer 530 may be used to indicate likelihood that the first n-gram in an n-gram pair (e.g., "at_os_") is a misinput of the second n-gram in the pair (e.g., "at_is_") when it appears in a future search term entered by a user. As discussed above, n-grams extracted by the N-grams extractor 540 may be associated with different probabilities, as determined by the n-gram misinput probability analyzer 530, indicating different likelihood that they represent misinput of search terms in the future. For example, a user may be inclined to misinput certain words such as "what_is_" to "what_os_" due to habits. In that case, there may be a high probability that "at_os_" actually means "at_is_" when it appears in a search term entered by a user. By contrast, the user may misinput "iss" as "is" a few times, but for most other times, whenever the user inputs "iss" such as in "kiss", "Swiss", "dissatisfaction", the user is always correct without backspacing. In that case, the n-gram pair of "at_iss" and "at_is_" would not indicate that "iss" is a misinput of "is" when it appears in the user search term in the future.

For determining such a probability, various statistical methods may be applied and configured into the n-gram misinput probability analyzer 530. For example, a noisy channel may be configured into n-gram misinput probability analyzer 530. Noisy channel model is a well-known concept in the art, and will not be described here in detail. Briefly, to implement the noisy channel model, the n-gram misinput probability analyzer 530 would be configured to receive the following inputs: a number of times the first n-gram in an n-gram pair was input by the user without correction, e.g. P(x); a number of times the second n-gram in the pair was input by the user without correction, e.g., P(w); a number of times the first n-gram was corrected to the second n-gram by the user, e.g., P(x|w). Using these inputs, the probability of the first n-gram may be misinput for the second n-gram may be determined by the following formula: P=P(x|w)P(w)/P(x).

Figure 14:
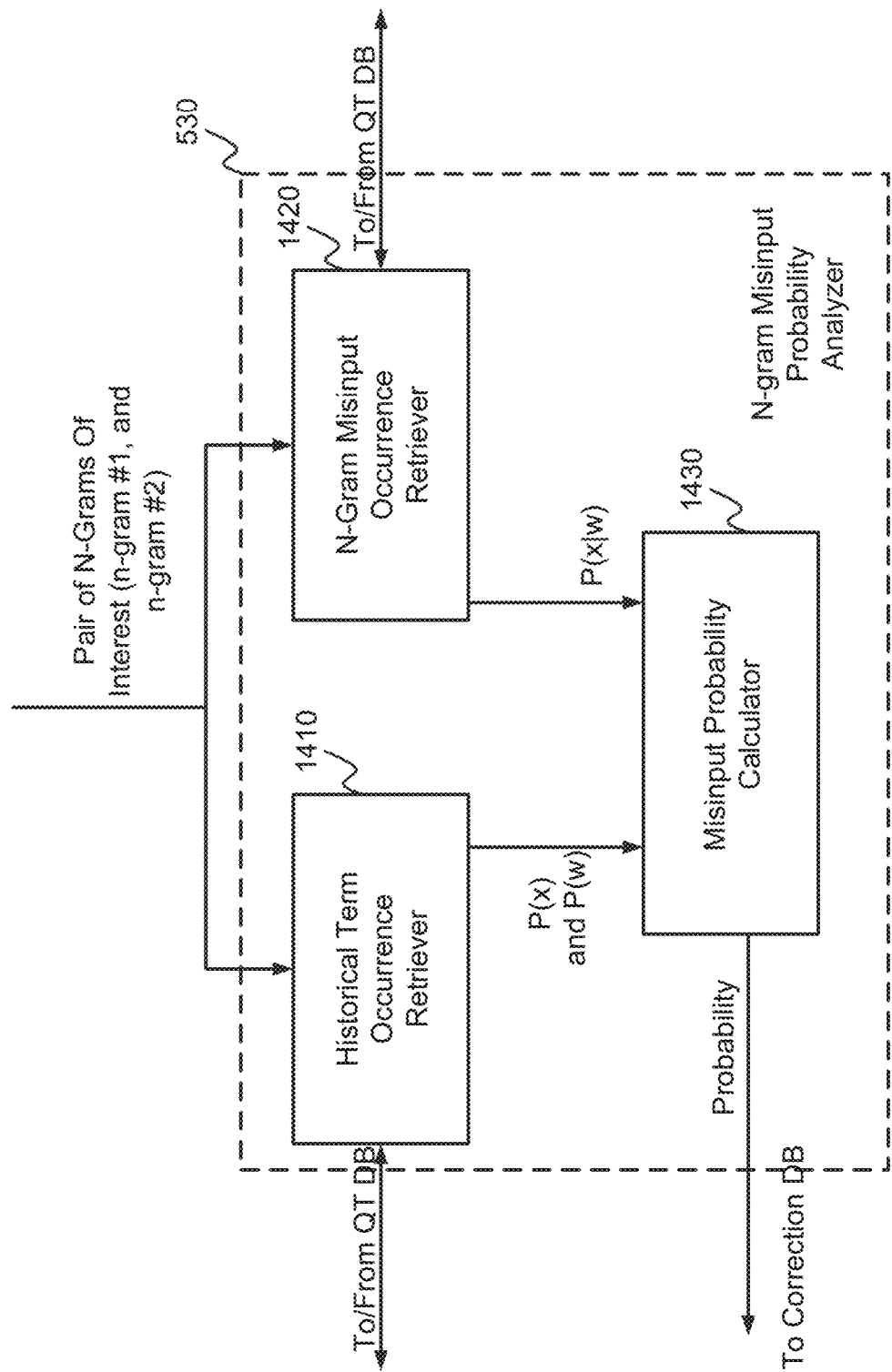
FIG. 14 illustrates an example of N-gram misinput probability analyzer shown in FIG. 5.

FIG. 14 illustrates an example of N-gram misinput probability analyzer 540 shown in FIG. 5. As shown, the n-gram misinput probability analyzer 530 in this example is configured to include a historical term occurrence retriever 1410, an n-gram misinput occurrence retriever 1420, a misinput probability calculator 1430 and/or any other components. As shown, the historical term occurrence retriever 1410 may be configured to receive historical search terms from a database, and n-gram pairs of interest. Based on a given n-gram pair received, the historical term occurrence retriever 1410 may extract a number of times the first n-gram in a n-gram pair was input by the user without correction, and a number of times, the second n-gram in the pair was input by the user without correction. As still illustrated, the n-gram misinput occurrence retriever 1420 may be configured to receive the n-gram pairs of interest and historical search terms from the database. Similarly, the n-gram misinput occurrence retriever 1420 may be configured to obtain a number of times the first n-gram was corrected to the second n-gram by the user using these inputs. As still illustrated, the misinput probability calculator 1430 may be configured to receive outputs of the historical term occurrence retriever 1410 and the n-gram misinput occurrence retriever 1420 as inputs and implement the formula P(x|w)P(w)/P(x) to determine a probability that the first n-gram is misinput of the second n-gram in the pair. As also shown, the probability determined by the misinput probability calculator 1430 may be stored in a correction database in association with the n-gram pair.

Figure 15:
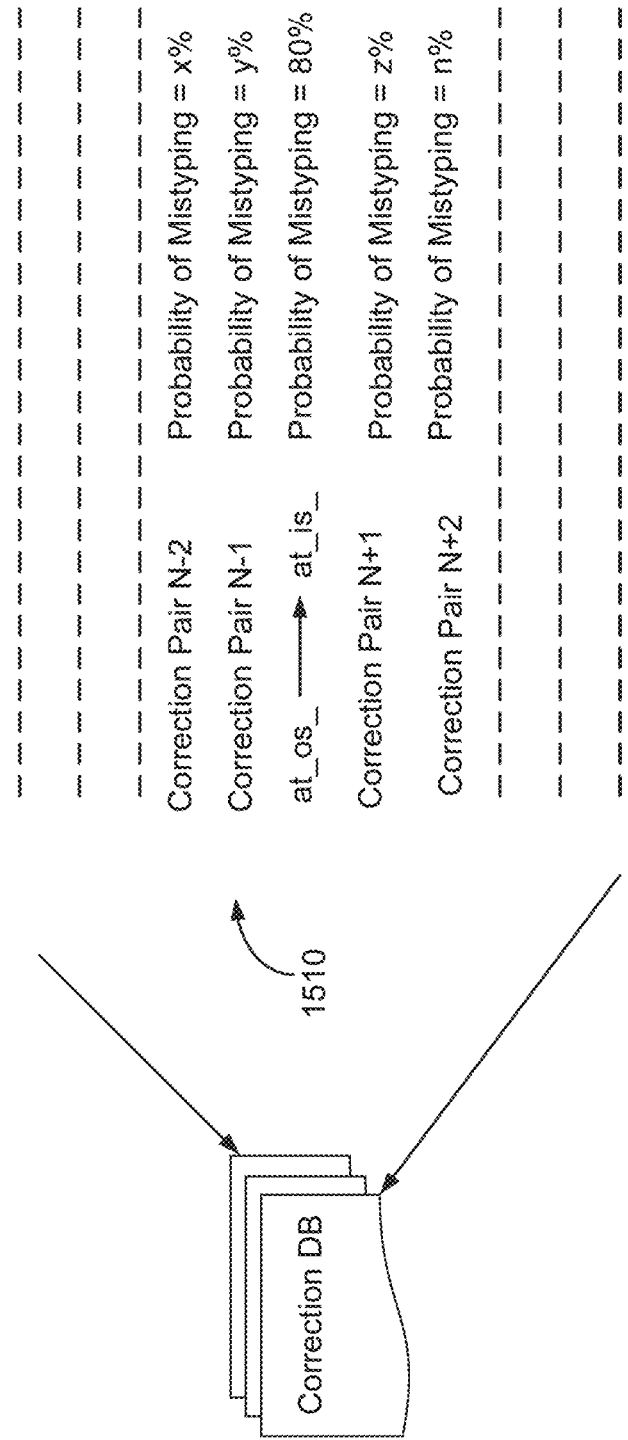
FIG. 15 illustrates an example storing probability determined in FIG. 14 for a given pair of n-grams in association with the given n-grams in a correction database.

FIG. 15 illustrates an example storing probability determined in FIG. 14 for a given pair of n-grams in association with the given n-grams in a correction database. As shown, the n-gram pairs 1510 may be stored in the correction database along with the corresponding probability to indicate likelihood the first n-gram of a given pair is a misinput of the second n-gram in the given pair. As illustration, an entry may be stored in the correction database to indicate there is 80% of likelihood that the first n-gram in the pair—"at_os_" is a misinput of the second n-gram—"at_is_".

Figure 16A:
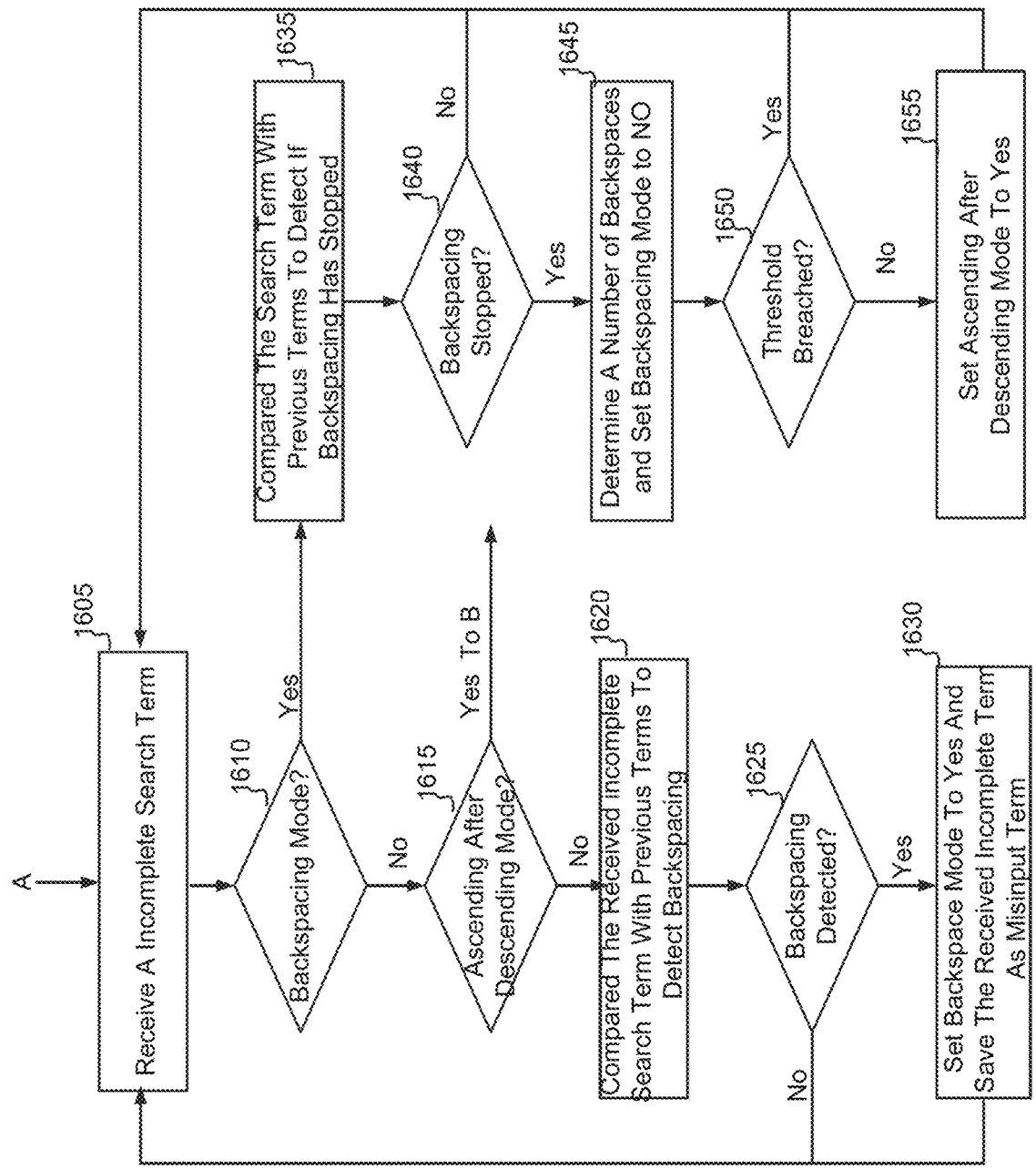
FIGS. 16A-B illustrate an exemplary method of storing N-gram pair in a correction database in accordance with the one embodiment of the disclosure.
Figure 16B:
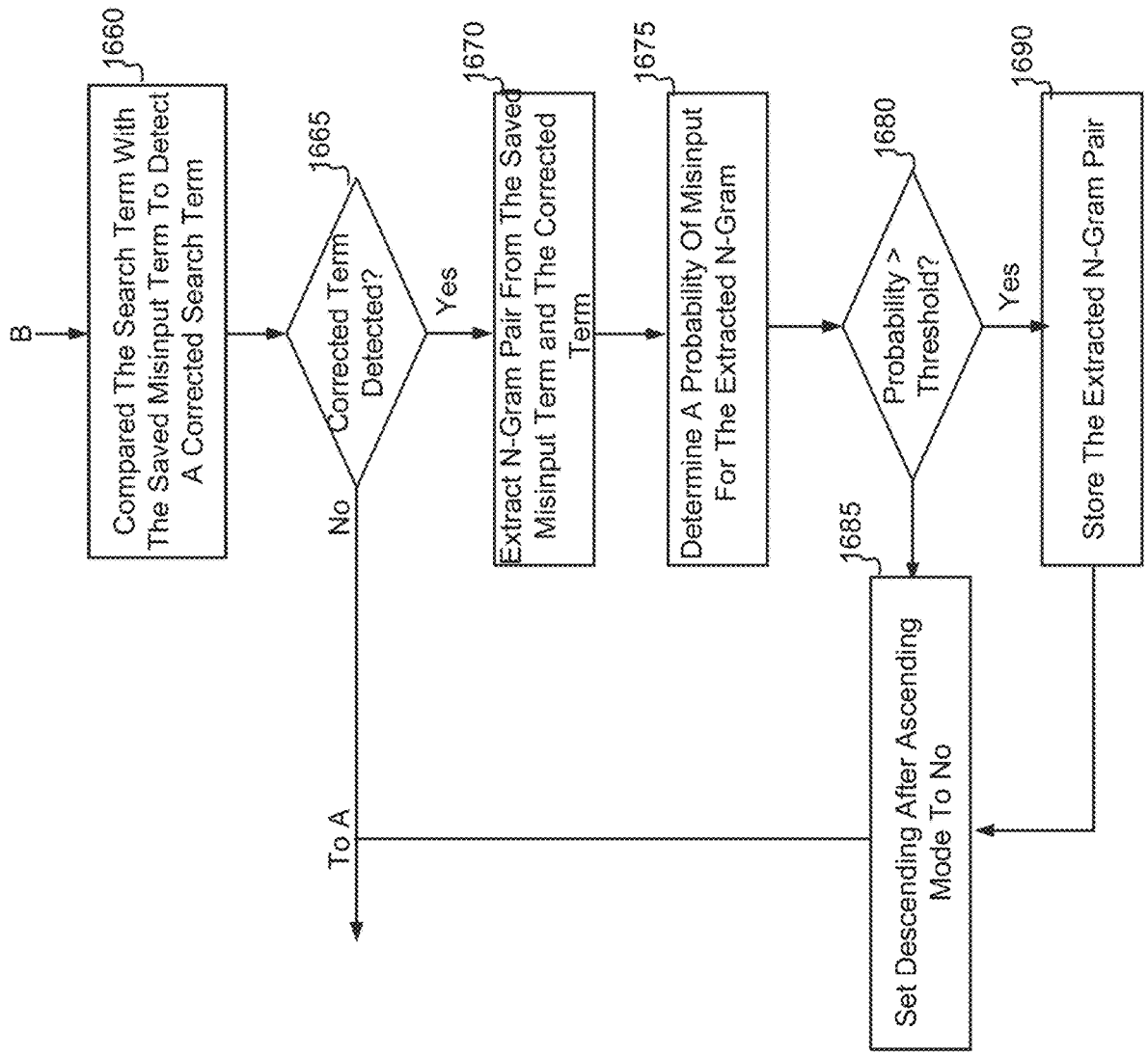

FIGS. 16A-B illustrate an exemplary method of storing N-gram pair in a correction database in accordance with the one embodiment of the disclosure. They will be continuously described with reference to FIG. 5. As shown, at 1605, an incomplete search term may be received. In some implementations, step 1605 may be implemented by a search term misinput detection unit the same as or substantial similar to the search term misinput detection unit 520 described herein.

At 1610, a decision may be made whether a backspace mode is detected. For example, the backspace mode may be set on whenever backspacing is detected by comparing the search term received at step 1605 with previously received incomplete search term(s). In some implementations, step 1610 may be implemented by a search term misinput detection unit the same as or substantial similar to the search term misinput detection unit 520 described herein. As shown, in the case where the backspace mode is not detected, the method proceeds to step 1615, and in the case where the backspace mode is detected, the method proceed to step 1635.

At 1615, a decision may be made whether an ascending immediately following a previous descending phase is detected. As described above, such a phase may indicate that the user is correcting the search term. In some implementations, step 1615 may be implemented by a search term misinput detection unit the same as or substantial similar to the search term misinput detection unit 520 described herein. As shown, in the case where the ascending immediately following a previous descending phase is not detected, the method proceeds to step 1620, and in the case where the such a mode is detected, the method proceed to step 1660.

At 1620, the incomplete search term may be compared with terms received previously to detect backspacing. As discussed above, backspace mode may be turned on when the currently received term has a length smaller than the previous received term(s). In some implementations, step 1620 may be implemented by a search term misinput detection unit the same as or substantial similar to the search term misinput detection unit 520 described herein.

At 1625, a decision may be made to determine whether backspacing is detected. As shown, in the case where the backspacing mode is not detected, the method proceeds to step 1620, and in the case where the backspace mode is detected, the method proceed to step 1660.

At 1630, the backspace mode may be set to yes, and the incomplete search term received at step 1605 may be saved as the misinput term. In some implementations, step 1630 may be implemented by a search term misinput detection unit the same as or substantial similar to the search term misinput detection unit 520 described herein.

At 1635, the incomplete search term received at step 1605 may be compared with terms previously received to detect if backspacing has stopped. In some implementations, step 1635 may be implemented by a search term misinput detection unit the same as or substantial similar to the search term misinput detection unit 520 described herein.

At 1640, a decision whether the backspacing has stopped may be made based on the comparison performed at step 1635. In some implementations, step 1640 may be implemented by a search term misinput detection unit the same as or substantial similar to the search term misinput detection unit 520 described herein. As shown, in the case where backspacing is not stopped, the method proceeds to step 1605, and in the case where backspacing is stopped, the method proceed to step 1645.

At 1645, a number of backspaces may be determined as the edit distance illustrated above and backspace mode may be set to no (since the backspacing has stopped). In some implementations, 1645 may be implemented by a search term misinput detection unit the same as or substantial similar to the search term misinput detection unit 520 described herein.

At 1650, the number of backspaces determined at 1645 may be compared with a threshold value. As discussed above, the operation performed at 1650 is to account for situations in which the user fine tunes the search term instead of correcting the search term. As also discussed, edit distance greater than certain threshold value typically indicates the user is fine tuning the search term instead of correcting the search term. In some implementations, step 1650 may be implemented by a search term misinput detection unit the same as or substantial similar to the search term misinput detection unit 520 described herein.

At 1655, the ascending after descending mode may be set to yes. In some implementations, step 1655 may be implemented by a search term misinput detection unit the same as or substantial similar to the search term misinput detection unit 520 described herein.

Now referring to FIG. 16B, at 1660, the search term received at 1605 may be compared with the misinput term saved at 1630. As discussed above, a number of criteria may be used for the comparison performed at step 1660. For example, the same length criteria may be used such that the corrected term may be detected if it has the same length as the save misinput term. As another example, the approximation range criteria may be used such the corrected term may be detected if it has the most sematic words among a range of incomplete search terms centered on one that has the same length as the save misinput term. In some implementations, 1660 may be implemented by an n-gram extractor the same as or substantial similar to the search term n-gram extractor 540 described herein.

At 1665, a decision may be made whether the corrected term is detected based on the criteria described above. In some implementations, step 1665 may be implemented by an n-gram extractor the same as or substantial similar to the search term n-gram extractor 540 described herein. As shown, in the case where the corrected term is detected, the method may proceed to step 1670 and in the case where the corrected term is not detected, the method may proceed back to step 1605.

At 1670, a pair of n-gram may be extracted from the pair of misinput term (step 1630) and the corrected term (step 1665). As discussed above, the operation performed at step 1670 is to extract a portion of the misinput/correction term pair such that the most relevant part of the pair may be used for future processing. In some implementations, step 1670 may be implemented by an n-gram extractor the same as or substantial similar to the search term n-gram extractor 540 described herein.

At 1675, a probability whether the n-gram pair extracted at step 1670 may be determined to indicate a likelihood the n-gram pair reflect misinput of the user that may be predicted in the future. As discussed above, a number of statistical models may be used for performing the operation at 1675. Among these models is the noisy channel model. In some implementations, 1675 may be implemented by an n-gram misinput probability analyzer the same as or substantial similar to the n-gram misinput probability analyzer 530 described herein.

At 1680, a decision whether the probability determined at step 1675 may be made. As shown, in the case where the probability is greater than a threshold value, the method may proceed to 1690 to save the extracted n-gram pair along with the probability; and in the case where the probability is lower than the threshold, the method may proceed to step 1685. In some implementations, 1680 may be implemented by an n-gram extractor the same as or substantial similar to the search term n-gram extractor 540 described herein At 1685, the descending after ascending mode may be set to no and method may be caused to proceed back to step 1605. In some implementations, step 1685 may be implemented by an n-gram extractor the same as or substantial similar to the search term n-gram extractor 540 described herein.

Returning to FIG. 5, the search term processing unit 510 as shown may be configured to receive current incomplete search term, detect and correct misinputting of the search term using entries in the correction database 560, and make search term suggestions based on corrected search terms. For example, as illustration, an incomplete search term "What_os_the_be . . . " may be received by the search term processing unit 510. The search term processing unit 510 may be configured to consult the correction DB 560 and determine that the "at_os" in the term received is likely a misinput of "at_is". Based on this determination, the search processing unit 510 may correct (temporary or permanently) the received incomplete search term to "What_is_the_be . . . ". Using other information such as contextual information (which may provide a clue that the user is search for tea product), user information (which may give a clue that the user is currently located in China), and historical information (which may indicate the user resides in the US) from the search term database 550, the search term processing unit 510 may be configured to make search term suggestion "What_is_the_best_tea_in_China".

Figure 17:
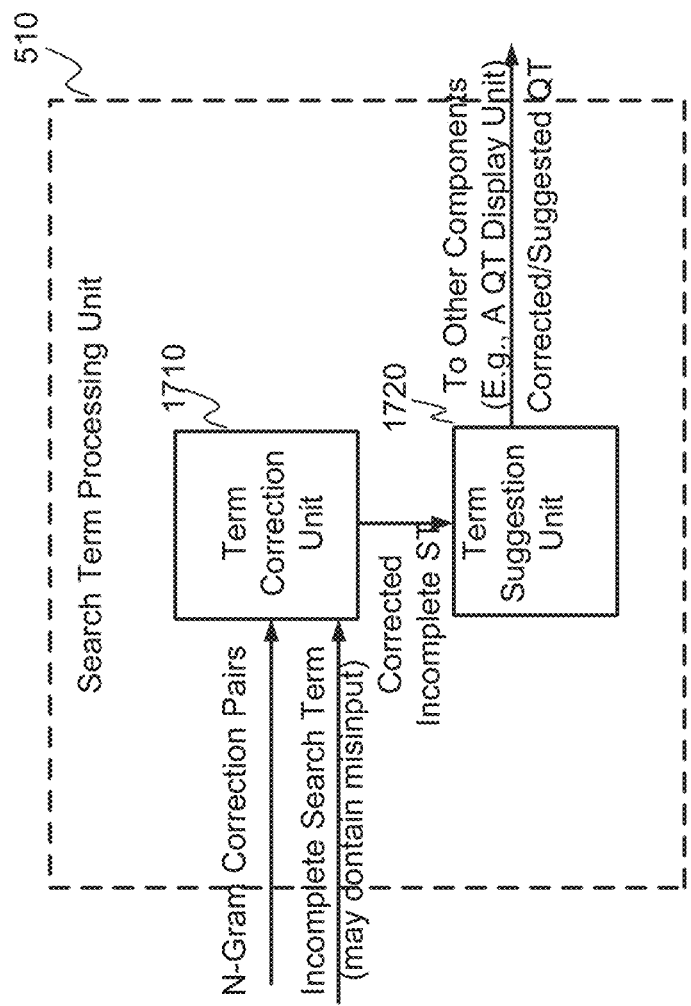
FIG. 17 illustrates one example of the search term processing unit 510 shown in FIG. 5.

FIG. 17 illustrates one example of the search term processing unit 510 shown in FIG. 5. As illustrated, the search term processing unit 510 may be configured to include a term correction unit 1710, a term suggestion unit 1720, and/or any other components. As shown, the term correction unit 1710 may be configured to receive an incomplete search term and n-gram correction pairs as inputs. Based on the n-gram correction pairs (e.g., received from the correction database 560 shown in FIG. 5, the term correction unit 1710 may make a correction to a given incomplete search term received if it detects the incomplete search term contains an n-gram in the n-gram pairs. As shown, the term correction unit 1710 may forward the incomplete search term corrected based on the n-gram pairs to the term suggestion unit 1720. The term suggestion unit 1720 may be configured to make search term suggestions (complete search terms) based on the corrected incomplete search term forwarded from the term correction unit 1710.

Figure 18:
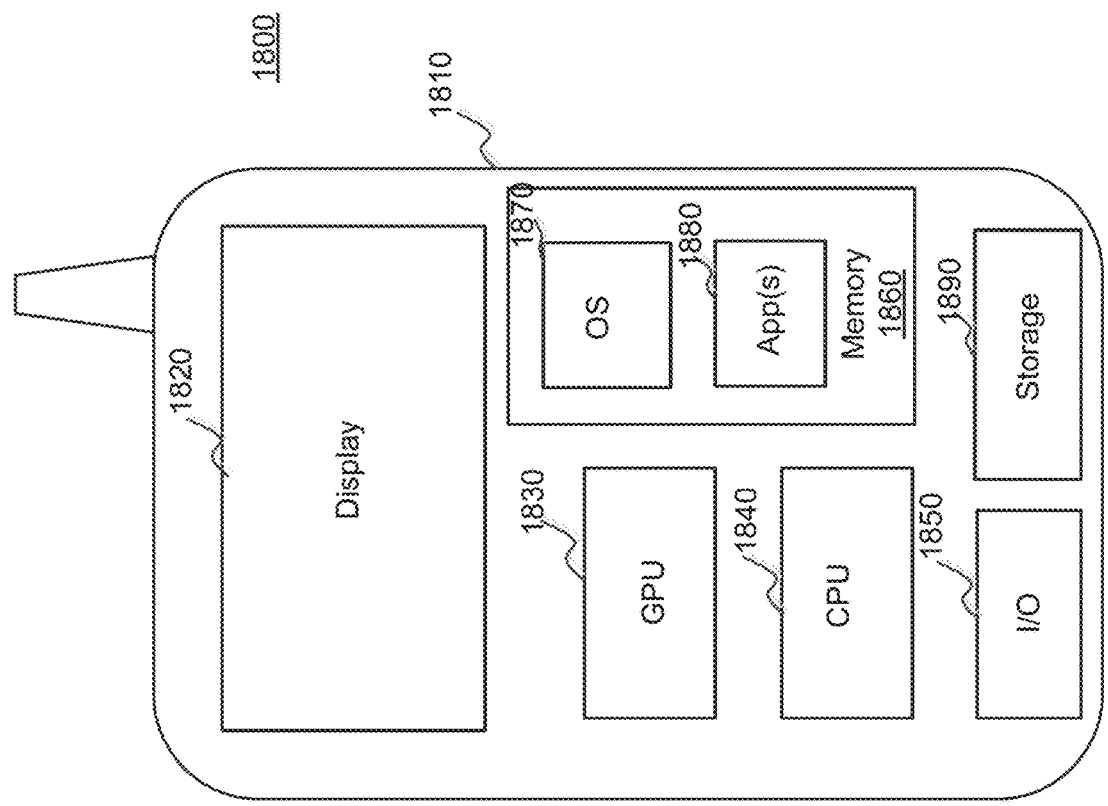
FIG. 18 depicts architecture of a mobile device which can be used to implement a specialized system incorporating the present teaching.

FIG. 18 depicts architecture of a mobile device which can be used to realize a specialized system implementing the present teaching. In this example, the user device on which content and advertisement are presented and interacted-with is a mobile device 1800, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1800 in this example includes one or more central processing units (CPUs) 1840, one or more graphic processing units (GPUs) 1830, a display 1820, a memory 1860, a communication platform 1810, such as a wireless communication module, storage 1890, and one or more input/output (I/O) devices 1850. Any other suitable component, including but not limited to a system bus or a controller (not shown), may also be included in the mobile device 1800. As shown in FIG. 18, a mobile operating system 1870, e.g., iOS, Android, Windows Phone, etc., and one or more applications 1880 may be loaded into the memory 1860 from the storage 1890 in order to be executed by the CPU 1840. The applications 1880 may include a browser or any other suitable mobile apps for receiving and rendering content streams and advertisements on the mobile device 1800. User interactions with the content streams may be achieved via the I/O devices 1850 and provided to search engine 130, the search term suggestion engine 140, and/or other components of system 100, e.g., via the network 120.

To implement various modules, units, and their functionalities described in the present disclosure, computer hardware platforms may be used as the hardware platform(s) for one or more of the elements described herein (e.g., search engine 130, the search term suggestion engine 140, and/or other components of system 100 described herein). The hardware elements, operating systems and programming languages of such computers are conventional in nature, and it is presumed that those skilled in the art are adequately familiar therewith to adapt those technologies to enhance search term suggestion described herein. A computer with user interface elements may be used to implement a personal computer (PC) or other input of work station or terminal device, although a computer may also act as a server if appropriately programmed. It is believed that those skilled in the art are familiar with the structure, programming and general operation of such computer equipment and as a result the drawings should be self-explanatory.

Figure 19:
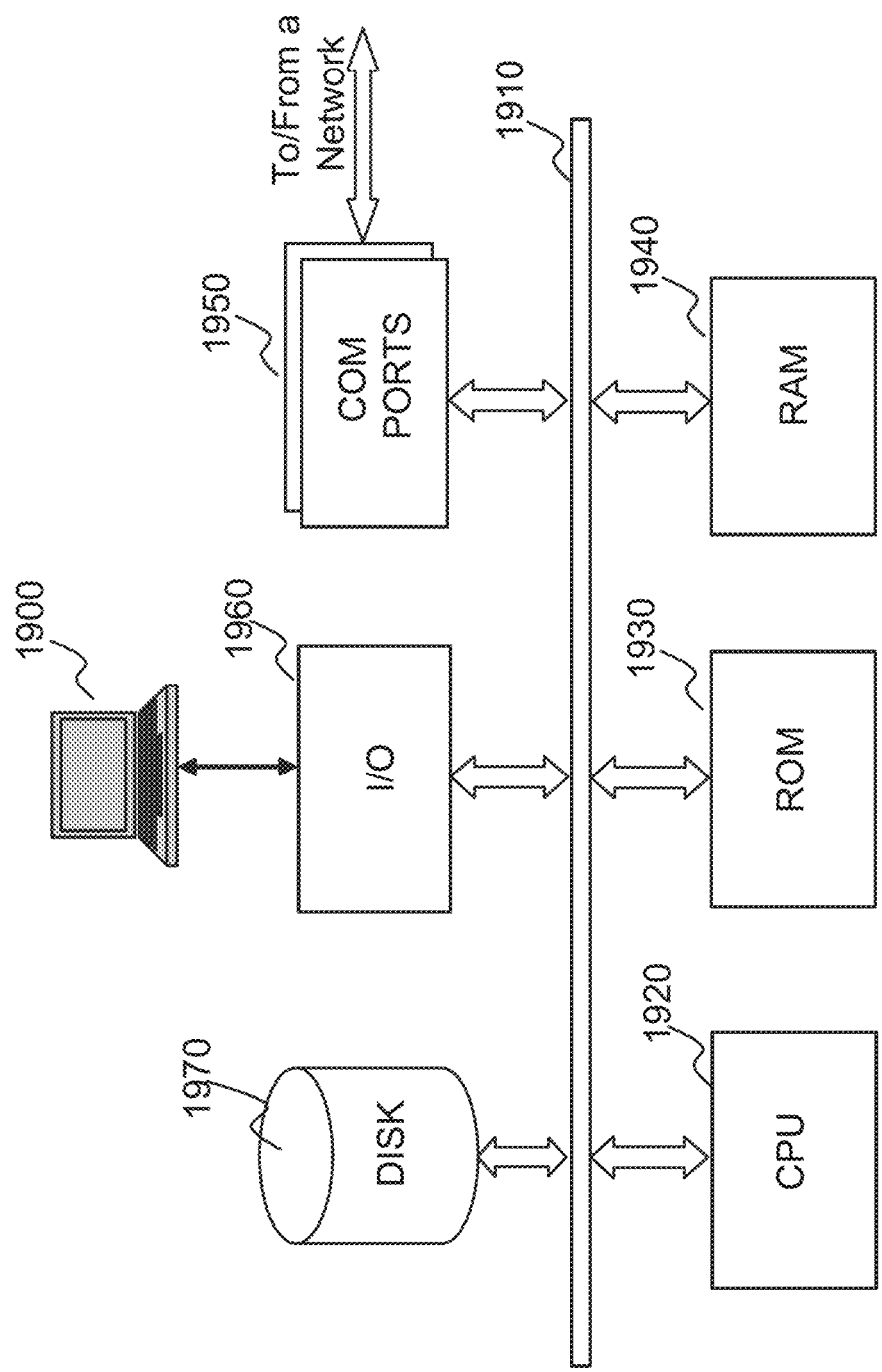
FIG. 19 depicts architecture of a computer which can be used to implement a specialized system incorporating the present teaching.

FIG. 19 depicts architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1900 may be used to implement any component of the enhanced search term suggestion techniques, as described herein. For example, the search engine 130 and/or the search term suggestion engine 140, etc., may be implemented on a computer such as computer 1900, via its hardware, software program, firmware, or a combination thereof. Although only one such computer is shown, for convenience, the computer functions relating to the search engine 130 and/or search term suggestion engine 140 may be implemented in a distributed fashion on a number of similar platforms, to distribute the processing load.

The computer 1900, for example, includes COM ports 1950 connected to and from a network connected thereto to facilitate data communications. The computer 1900 also includes a central processing unit (CPU) 1920, in the form of one or more processors, for executing program instructions. The exemplary computer platform includes an internal communication bus 1910, program storage and data storage of different forms, e.g., disk 1970, read only memory (ROM) 1930, or random access memory (RAM) 1940, for various data files to be processed and/or communicated by the computer, as well as possibly program instructions to be executed by the CPU. The computer 1900 also includes an I/O component 1960, supporting input/output flows between the computer and other components therein such as user interface elements 1980. The computer 1900 may also receive programming and data via network communications.

Hence, aspects of the methods of enhancing ad serving and/or other processes, as outlined above, may be embodied in programming. Program aspects of the technology may be thought of as "products" or "articles of manufacture" typically in the form of executable code and/or associated data that is carried on or embodied in a input of machine readable medium. Tangible non-transitory "storage" input media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other search engine 130 and/or search term suggestion engine 140 into the hardware platform(s) of a computing environment or other system implementing a computing environment or similar functionalities in connection with search engine 130 and/or search term suggestion engine 140. Thus, another input of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the enhanced ad serving based on user curated native ads as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network, for providing enhanced search term suggestions, the method comprising:
   receiving a set of search terms entered by a user;
   detecting one or more editing operations performed on the set of search terms, wherein the one or more editing operations include a descending phase and an ascending phase, the ascending phase being after the descending phase;
   identifying a misinput corresponding to a first search term to which the user applies the one or more editing operations;
   selecting one of a plurality of ascending search terms entered during the ascending phase as a correction of the misinput;
   responsive to a magnitude of change performed via the one or more editing operations to transform the first search term into the selected ascending search term being within a threshold value, storing the selected ascending search term and the first search term as a pair; and
   for each ascending search term entered during the ascending phase, determining a probability that the ascending search term is a correction of the misinput,
   determining whether the probability has breached a predetermined threshold value;
   in response to the probability having breached the threshold value, replacing the first search term with the selected ascending search term; and
   determining search terms to be suggested to the user based on the selected ascending search term.

2. The method of claim 1, wherein the pair is identified by identifying the first search term at a beginning of the descending phase and by identifying the selected ascending search term in the ascending phase as a corresponding corrected term based on the identified first search term.

3. The method of claim 2, wherein the selected ascending search term is identified as the corresponding corrected term by virtue of the first search term having a same length as the corresponding corrected term.

4. The method of claim 2, wherein the selected ascending search term is identified as the corresponding corrected term by virtue of the first search term matching the identified corrected term with respect to semantic meaning.

5. The method of claim 1, further comprising:
   responsive to a detection of a misinput term subsequently entered by a user that matches the first search term, retrieving the pair so that the selected ascending search term is suggested to the user as a search term suggestion or so that the misinput term is automatically corrected with the selected ascending search term, wherein the threshold value is predetermined.

6. The method of claim 1, wherein the pair is identified by extracting a pair of n-grams from the first search term and the selected ascending search term.

7. The method of claim 1, further comprising:
   for each ascending search term entered during the ascending phase, determining a probability that the ascending search term is a correction of the misinput,
   wherein the determination of the probability is based on a noisy channel model.

8. The method of claim 1, wherein the misinput comprises a skipped, unnecessarily added, and/or wrongly inputted character of an intended search term.

9. A system configured for providing enhanced search term suggestions, comprising:
   a search term processor configured to receive a set of search terms entered by a user;
   a search term misinput detector configured to detect one or more editing operations performed on the set of search terms, wherein the one or more editing operations include a descending phase and an ascending phase, the ascending phase being after the descending phase;
   the search term misinput detector configured to identify a misinput corresponding to a first search term to which the user applies the one or more editing operations;
   an n-grams extractor configured to:
      select one of a plurality of ascending search terms entered during the ascending phase as a correction of the misinput; and
      responsive to a magnitude of change performed via the one or more editing operations to transform the first search term into the selected ascending search term being within a threshold value, store the selected ascending search term and the first search term as a pair; and
   an n-gram misinput probability analyzer configured, for each ascending search term entered during the ascending phase, to determine a probability that the ascending search term is a correction of the misinput,
   wherein the n-gram misinput probability analyzer is further configured to determine whether the probability has breached a predetermined threshold value, and
   wherein the search term processor is further configured to:
      in response to the probability having breached the threshold value, replace the first search term with the selected ascending search term; and
      determine search terms to be suggested to the user based on the selected ascending search term.

10. The system of claim 9, wherein the search term misinput detector is configured such that the pair is identified by identifying the first search term at a beginning of the descending phase and by identifying the selected ascending search term in the ascending phase as a corresponding corrected term based on the identified first search term.

11. The system of claim 10, wherein the selected ascending search term is identified as the corresponding corrected term by virtue of the first search term having a same length as the corresponding corrected term.

12. The system of claim 10, wherein the selected ascending search term is identified as the corresponding corrected term by virtue of the first search term matching the identified corrected term with respect to semantic meaning.

13. The system of claim 9, wherein the n-grams extractor is further configured, responsive to a detection of a misinput term subsequently entered by a user that matches the first search term, to retrieve the pair so that the selected ascending search term is suggested to the user as a search term suggestion or so that the misinput term is automatically corrected with the selected ascending search term, wherein the threshold value is predetermined.

14. The system of claim 9, wherein the n-grams extractor is configured such that the pair is identified by extracting a pair of n-grams from the first search term and the selected ascending search term.

15. The system of claim 9, further comprising:

an n-gram misinput probability analyzer configured, for each ascending search term entered during the ascending phase, to determine a probability that the ascending search term is a correction of the misinput, wherein the n-gram misinput probability analyzer is configured such that the determination of the probability is based on a noisy channel model.

16. A machine-readable, non-transitory and tangible medium having data recorded thereon for providing enhanced search term suggestions, the medium, when read by the machine, causes the machine to perform the following:

receiving a set of search terms entered by a user;

detecting one or more editing operations performed on the set of search terms, wherein the one or more editing operations include a descending phase and an ascending phase, the ascending phase being after the descending phase;

identifying a misinput corresponding to a first search term to which the user applies the one or more editing operations;

selecting one of a plurality of ascending search terms entered during the ascending phase as a correction of the misinput; and responsive to a magnitude of change performed via the one or more editing operations to transform the first search term into the selected ascending search term being within a threshold value, storing the selected ascending search term and the first search term as a pair; and for each ascending search term entered during the ascending phase, determining a probability that the ascending search term is a correction of the misinput, determining whether the probability has breached a predetermined threshold value;

in response to the probability having breached the threshold value, replacing the first search term with the selected ascending search term; and determining search terms to be suggested to the user based on the selected ascending search term.

17. The machine-readable, non-transitory and tangible medium of claim 16, wherein the pair is identified by identifying the first search term at a beginning of the descending phase and by identifying the selected ascending search term in the ascending phase as a corresponding corrected term based on the identified first search term.

18. The machine-readable, non-transitory and tangible medium of claim 16, wherein the selected ascending search term is identified as the corresponding corrected term by virtue of the first search term having a same length as the corresponding corrected term.

\* \* \* \* \*